(12) United States Patent
Tinsman et al.

(10) Patent No.: US 7,930,449 B2
(45) Date of Patent: Apr. 19, 2011

(54) METHOD AND SYSTEM FOR DATA TRANSMISSION

(75) Inventors: John Tinsman, Blonuy (CH); Matthew Huntington, Mill Valley, CA (US); Gerard Teurlinx, Sunnyvale, CA (US)

(73) Assignee: OpenTv Inc., San Francisco, CA (US)

( * ) Notice: Subject to any disclaimer, the term of this patent is extended or adjusted under 35 U.S.C. 154(b) by 200 days.

(21) Appl. No.: 11/531,728

(22) Filed: Sep. 14, 2006

(65) Prior Publication Data

US 2008/0126558 A1 May 29, 2008

(51) Int. Cl.
- *G06F 3/00* (2006.01)
- *G06F 5/00* (2006.01)
- *G06F 13/00* (2006.01)
- *H04N 7/173* (2011.01)

(52) U.S. Cl. .......... 710/52; 709/231; 709/233; 711/117; 711/122; 725/9; 725/87; 725/94

(58) Field of Classification Search .................. None
See application file for complete search history.

(56) References Cited

U.S. PATENT DOCUMENTS

| | | | | |
|---|---|---|---|---|
| 5,742,347 A * | 4/1998 | Kandlur et al. | .......... | 375/240.25 |
| 5,872,588 A * | 2/1999 | Aras et al. | .......... | 725/14 |
| 6,219,358 B1 * | 4/2001 | Pinder et al. | .......... | 370/537 |
| 6,675,387 B1 * | 1/2004 | Boucher et al. | .......... | 725/105 |
| 6,971,121 B2 * | 11/2005 | West et al. | .......... | 725/142 |
| 7,295,758 B2 * | 11/2007 | Kikuchi et al. | .......... | 386/329 |
| 2002/0059623 A1 * | 5/2002 | Rodriguez et al. | .......... | 725/91 |
| 2002/0168178 A1 * | 11/2002 | Rodriguez et al. | .......... | 386/92 |
| 2002/0194361 A1 * | 12/2002 | Itoh et al. | .......... | 709/233 |
| 2003/0149989 A1 * | 8/2003 | Hunter et al. | .......... | 725/89 |
| 2004/0047417 A1 * | 3/2004 | Gordon et al. | .......... | 375/240.12 |
| 2004/0114567 A1 * | 6/2004 | Kubler et al. | .......... | 370/349 |
| 2004/0136352 A1 * | 7/2004 | Fu et al. | .......... | 370/341 |
| 2004/0175133 A1 * | 9/2004 | Kashiwagi et al. | .......... | 386/95 |
| 2005/0008002 A1 * | 1/2005 | Kubler et al. | .......... | 370/352 |
| 2005/0122974 A1 * | 6/2005 | Hubler | .......... | 370/389 |
| 2007/0064673 A1 * | 3/2007 | Bhandaru et al. | .......... | 370/351 |
| 2007/0098007 A1 * | 5/2007 | Prodan et al. | .......... | 370/443 |
| 2007/0258699 A1 * | 11/2007 | Kikuchi et al. | .......... | 386/95 |

FOREIGN PATENT DOCUMENTS

WO  WO-9828915 A2  7/1998
WO  WO-0180570 A2  10/2001

OTHER PUBLICATIONS 07116167.3, "European Application No. 07116167.3 EP Office Action mailed Oct. 9, 2008", OAR-4MO, 3.
"European Applicaion Serial No. 07116167.3, Office Action mailed on Jan. 28, 2010", 3 pgs.

* cited by examiner

*Primary Examiner* — Henry W Tsai
*Assistant Examiner* — Michael Sun
(74) *Attorney, Agent, or Firm* — Schwegman, Lundberg & Woessner, P.A.

(57) ABSTRACT

A method for transmitting data. Data received from a data source is retained in a buffer. Initial data may be provided from the buffer. Additional data may be provided from the buffer.

42 Claims, 16 Drawing Sheets

METHOD AND SYSTEM FOR DATA TRANSMISSION

FIELD

This application relates generally to the field of electronic communications and, in an example embodiment, to a method and system to transmit data.

BACKGROUND

An internet protocol (IP) delivery system (e.g., to provide video content and/or directory data) may use a multicast data transmission protocol to improve scalability. Much of the data delivered in the system may be hierarchical in nature, such that certain data in a data set is received before a receiver can make use of the remainder of that data set. The receiver typically waits for an access point (e.g. the starting or top element) in the data set to enable processing of the remaining elements of the data set. Waiting for an access point may introduce an undesirable delay, which can adversely affect a receiver's performance and an experience of a user of the system.

BRIEF DESCRIPTION OF DRAWINGS

Embodiments are illustrated by way of example and not limitation in the figures of the accompanying drawings, in which like references indicate similar elements and in which.

DETAILED DESCRIPTION

In the following description, for purposes of explanation, numerous specific details are set forth in order to provide a thorough understanding of an embodiment of the present invention. It will be evident, however, to one skilled in the art that the present invention may be practiced without these specific details.

Data may be transmitted through a networked system (e.g., an interactive television system) that is received by a receiving device (e.g., a switch/router) and distributed to one or more intermediate devices, ultimately for presentation on user devices. In an embodiment, the receiving device may attempt to de-jitter the data retained within a buffer by selecting a known data rate, selecting a provided data rate or calculating the data rate so that the retained data may be provided at a fixed data rate.

The transmitted data may be hierarchical, where portions of the data may use an access point to decode prior and/or subsequently received data. In an embodiment, the receiving device may provide one or more additional access points in the data that it provides to the intermediate device, which may enable faster access to the hierarchical data.

In response to data requests, the receiving device may provide initial data and additional data to enable the intermediate device to present the content. The initial data may include an access point, which may be used to enable decoding of remaining initial data and/or the additional data.

In an example embodiment, the initial data may include intermediate join data that includes data that has been identified as access points. Retained data may also be used to reconstruct one more access points on the receiving device as intermediate join data.

In an example embodiment, the retained data may be buffered on the receiving device in segments starting at an access point that may be provided as the initial data.

Example Data Distribution System

Figure 1:
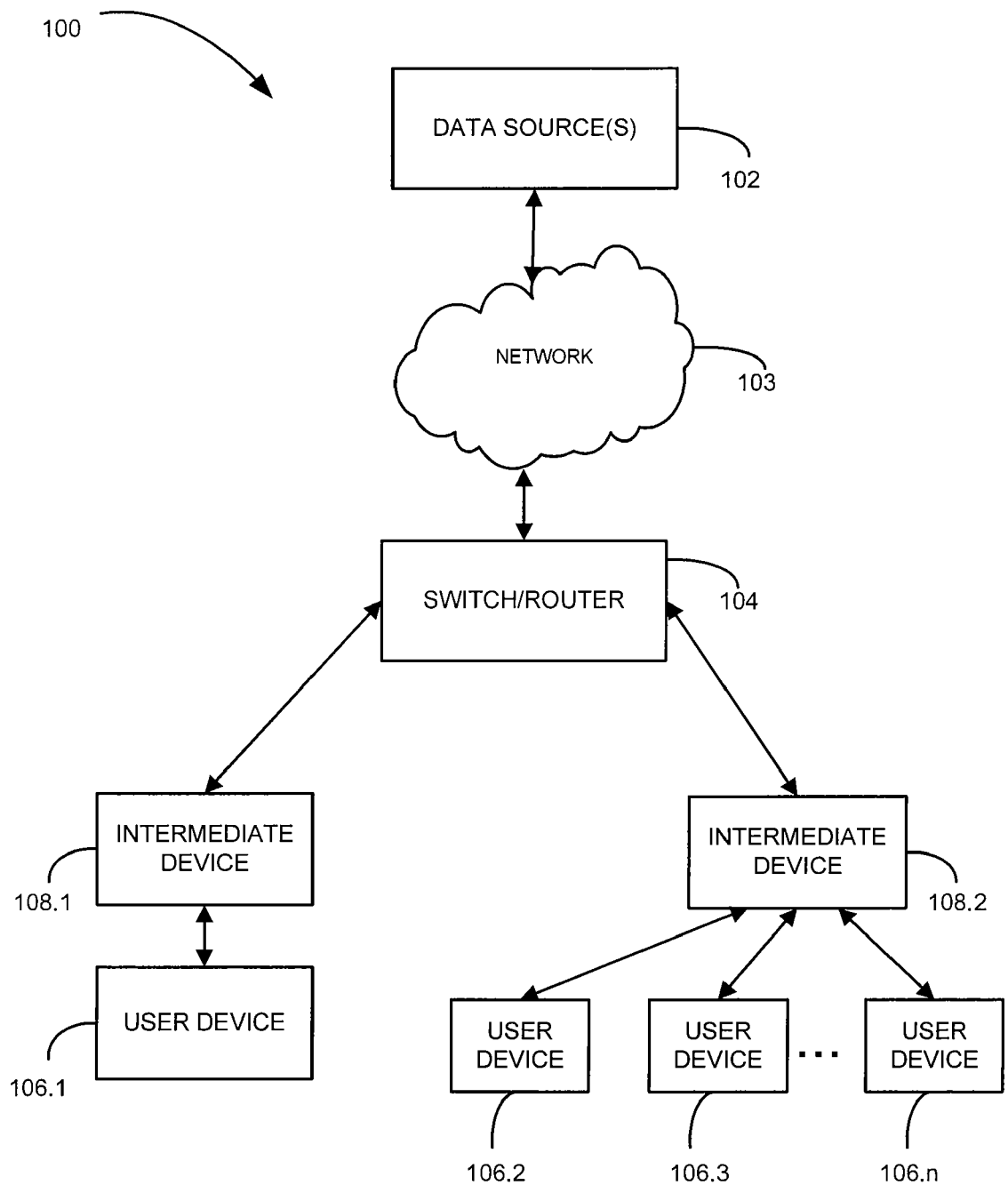
FIG. 1 is a block diagram of a system for distributing data to a switch/router in accordance with an example embodiment.

Referring to FIG. 1, an example embodiment of a system 100 for distributing data to a switch/router is illustrated. A data source 102 may provide data to a network device (e.g., a switch or router 104) over a network 103. In an example embodiment, the data source 102 may aggregate data from a number of sources of data.

In an example embodiment, the data may include media such as video content in the form of a movie or television program and/or digital music content such as an MP3 file. In an example embodiment, the data may be sequential, such as frames of video content. Further, the data may be hierarchical such that encoding of successive frames and/or packets of the data may use data relative techniques. Such a hierarchical technique may be used with compressed video content. In an example embodiment, the data may provide a video game, a patch file, an interactive application data, and/or the like. In an example embodiment, the data may include informational content. It should be appreciated that other types of data may also be used with the system 100.

The switch/router 104 may route data to and receive data from devices such as the intermediate devices 108.1, 108.2 through the network 103. The network 103 may include a private network, a public network such as the Internet, an access network, or combinations of the private network, the public network and/or the access network. In an example embodiment, the switch/router 104 may include a Digital Subscriber Line Access Multiplexer (DSLAM).

The network 103 may be an internet protocol (IP) network, a telephone network, a cable network, a core delivery network, or any other network to deliver digital data. In an example embodiment, the data may be provided to the switch/router 104 over the network 103 via a multicast transmission protocol, a unicast transmission protocol, or any other protocol suitable for communicating digital data.

The switch/router 104 may be located at a home or a business location and may be an edge router. In an example embodiment, the switch/router 104 may inspect incoming packets of data to determine a packet type and take type-specific action.

In an example embodiment, a size of one or more buffers of the router/switch 104 may be pre-defined on the switch/router 104. The size of one or more buffers of the switch/router 104 may, however, be determined empirically by the switch/router 104. In an example embodiment, the size of the buffer may be sufficient to retain initial data to be sent to a requester. For example, the size of the buffer may be sufficient to retain a group of pictures (GOP) or its equivalent. In an example embodiment, the size of the buffer may be sufficient to retain a span of data between two access points.

A non-networked intermediate device 108.1 may provide the data to a user device 106.1. Examples of the non-networked intermediate device 108.1 include a set top box (STB), a digital video recorder (DVR), a video decoder, a computer system, and the like. A networked intermediate device 108.2 may provide the data to a number of user devices 106.2-106.n. Examples of the networked intermediate device 108.2 may include a STB, a DVR, a video decoder, a computer system, a server, and the like. For example, the networked intermediate device 108.2 may include a STB and the user devices 106.2-106.n may be televisions. For example, the STB may distribute received content to multiple televisions within a home or connected to a network.

It will be appreciated that the intermediate devices 108.1, 108.2 may be located at a single location, such as a home or a place of business occupied by an operator of the user devices 106.1-106.n.

In an example embodiment, the intermediate devices 108.1, 108.2 may transmit received data to other devices including additional intermediate devices 108.1, 108.2. For example, the intermediate devices 108.1, 108.2 may retain received data.

The user devices 106.1-106.n may include any display device (with or without receiver capability) including televisions, monitors, computer systems, digital media players, gaming devices, mobile phones, personal digital assistants (PDAs), and the like. Software may be provided on the user devices 106.1-106.n to configure the devices 106.1-106.n to render media content to a user.

In an example embodiment, the user device 106.1 may be combined with the intermediate device 108.1 in a combination device.

Example Interactive Television Environment

Figure 2:
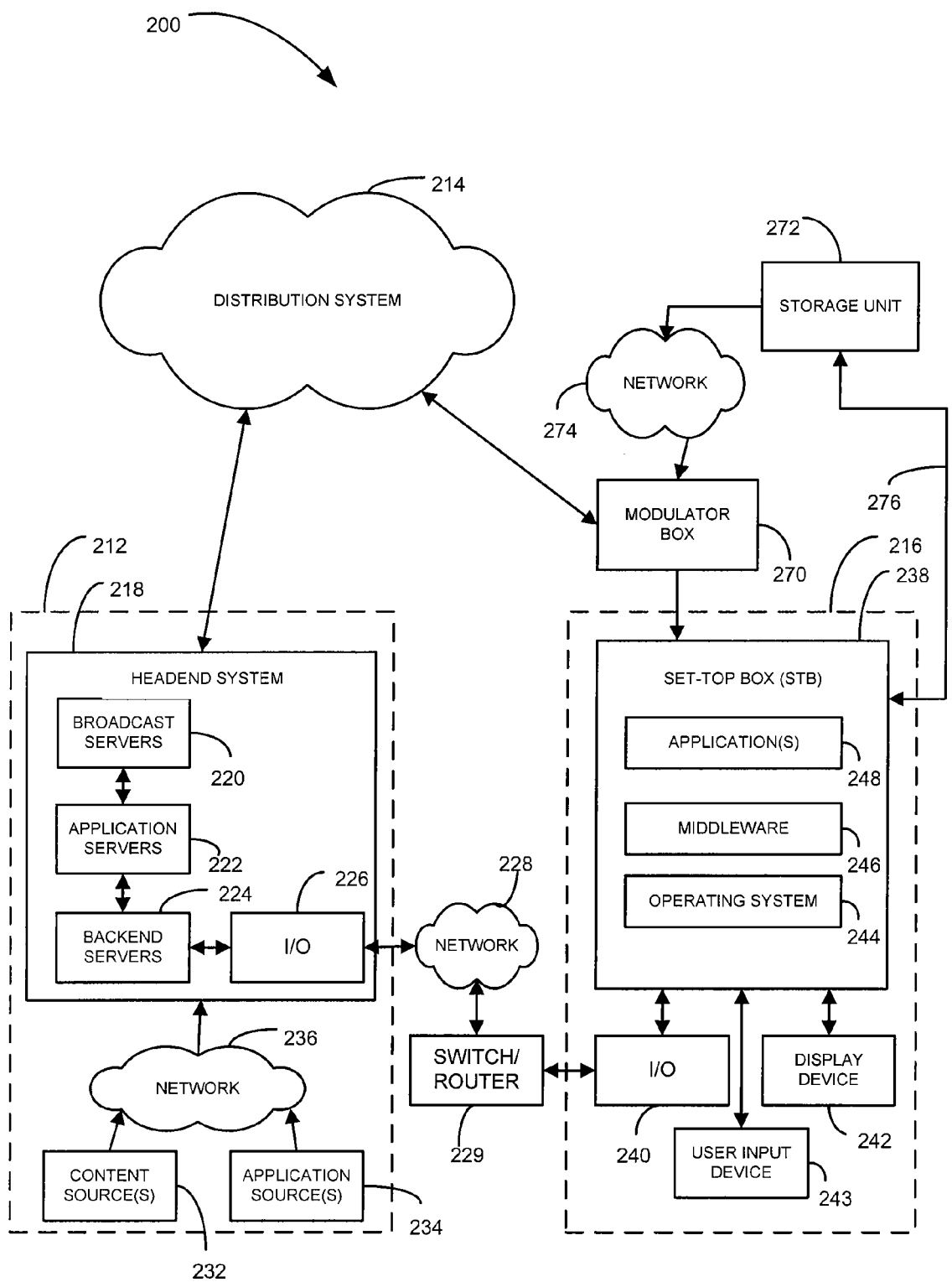
FIG. 2 illustrates a diagrammatic representation of an example interactive television environment.

FIG. 2 is a diagrammatic representation of an example interactive television environment 200. The interactive television environment 200 may be implemented in the system 100 (see FIG. 1). The interactive television environment 200 may include a source system 212 that communicates data (e.g., television/video content data and interactive application data) via a distribution network or system 214 and one or more modulator boxes 270 to a receiver system 216. In other example embodiments, the modulator box 270 may be replaced with (or include) a PCI board, a USB dongle or the like. In one example embodiment, the interactive television environment 200 may optionally include a storage unit 272 (e.g., personal computer) that communicates stored data via a network 274 to the modulator box 270 which, in turn, communicates the stored data, television content data, and interactive application data to the receiver system 216. The modulator box 270, the storage unit 272, and the receiver system 216 may be co-located in a subscriber's home. Thus, in one embodiment, the modulator box 270 may combine television content data and interactive application data received from the remote source system 212 with local stored data provided by the storage unit 272 provided at the subscriber's home. It may be appreciated that the storage unit 272 may be any computer device running appropriate software (e.g., Linux or Microsoft Windows). In an example embodiment, the modulator box 270 may be located within a head-end system 218.

Turning first to the source system 212, an example headend system 218 operates to communicate the data as a broadcast transmission. To this end, the headend system 218 is shown to include one or more broadcast servers 220 and, optionally, one or more application servers 222. Each of the broadcast servers 220 may operate to receive, encode, packetize, multiplex, modulate, and broadcast data from various sources and of various types. While the example embodiment is described herein as transmitting data from the headend system 218 as a broadcast, it will be appreciated that the relevant data could also be unicast or multicast from the source system 212 via the distribution system 214 and the modulator box 270 to the receiver system 216. In various embodiments, data could also be transmitted from the source system 212 via a network connection to the receiver system 216.

Each application server 222, in one example embodiment, may serve to compile and provide interactive data modules to the broadcast server 220. The interactive data modules may also include data that is utilized by an interactive television application. An application server 222 may also include multiplexing functionality to enable multiplexing of, for example, interactive television applications and associated data with audio and video signals received from various sources. An application server 222 may also have the capability to feed (e.g., stream) multiple interactive television applications to one or more broadcast servers 220 for distribution to the receiver system 216. To this end, each application server 222 may implement a so-called "carousel", whereby code and data modules are provided to a broadcast server 220 in a cyclic, repetitive manner for inclusion within a transmission from the headend system 218. In other embodiments, code may reside permanently in the set-top box 238 (e.g., the code may be stored in non-volatile memory of the set-top box 238), may be pushed or downloaded to the set-top box 238, or be provided to the set-top box 238 in any other manner. In an example embodiment, the application servers 222 may communicate directly with communications I/O interface, such that inputs may be multiplexed from broadcast servers 220, data servers, and application servers 222 to generate various broadcast streams.

The headend system 218 is also shown by way of example to include one or more backend servers 224, which are coupled to the application servers 222 and to a communications I/O interface in the example form of a modem pool 226. In an example embodiment, the communications I/O interface may be a network interface, such that IP traffic is provided for an entire path to a DSLAM or equivalent. In the example modem pool configuration, the modem pool 226 may be coupled to receive data from the receiver systems 216 via a network 228 (e.g., the Internet) through a switch/router 229 and to provide this data to the backend servers 224. The backend servers 224 may then provide the data, received from the receiver system 216, to the application servers 222 and the broadcast servers 220. Accordingly, the switch/router 229, network 228 and the modem pool 226 may operate as a return channel whereby a receiver system 216 is provided with interactivity with the source system 212. Data provided to the headend system 218 via the return channel may include, merely for example, user input to an interactive television application executed at the receiver system 216 or data that is generated by the receiver system 216 and communicated to the source system 212. It will however be appreciated that any data may be communicated via the return channel (e.g., statistical data, data metering user viewing selections, etc.). The return channel 230 may also provide a channel whereby programs, targeted advertisements/commercials, and applications from the source system 212 are provided to the receiver system 216.

Within the source system 212, the headend system 218 may optionally to receive data (e.g., content, code and application data) from external sources. For example, FIG. 2 illustrates the headend system 218 as being coupled to one or more content sources 232 and one or more application sources 234 via a network 236 (e.g., the Internet). For example, a content source 232 may be a provider of entertainment content (e.g., movies), a provider of real-time dynamic data (e.g., weather information), a plurality of targeted advertisements, prime time viewing advertisements, or the like. An application source 234 may be a provider of any interactive television application. For example, one or more application sources 234 may provide a TV Media Player Application, Electronic Program Guide (EPG) and navigation applications, messaging and communication applications, information applications, sports applications, and/or games and gaming applications.

Turning now to the example distribution system 214, the distribution system 214 may, in one embodiment, support the broadcast distribution of data from the source system 212 to the receiver system 216. As shown, the distribution network or system 214 may comprise a satellite, cable, terrestrial or Digital Subscribers Line (DSL) network, or any other data communication network or combination of such networks.

The receiver system 216 is shown, in one example embodiment, to include a receiver device in the example form of a set-top box (STB) 238 that receives data (primary and secondary content streams) via the distribution system 214 and the modulator box 270, a communications I/O interface in the example form of a modem 240 for return channel communications with the headend system 218. It will be appreciated that the communication I/O interfaces 226, 240 may be selected dependent upon the nature of the network 228. For example, the communications I/O interfaces 226, 240 may include a cable return module, a DSL return module, or the like. The receiver system 216 is also shown to include other optional external systems such as a user input device 243 (e.g., a keyboard, remote control, mouse etc.) and a display device 242, coupled to the set-top box 238, for the display of content received at the set-top box 238. In one example embodiment, the display device 242 may be a television set.

The set-top box 238 may execute three layers of software, namely an operating system 244, middleware 246 and, optionally, one or more interactive television applications 248. The middleware 246 may operate to shield the interactive television application 248 from differences of various operating systems 244 and differences in hardware of different set-top boxes 238. To this end, the middleware 246 may provide driver Application Program Interfaces (APIs) and a library to translate instructions received from an interactive television or stored data application 248 into low-level commands that may be understood by set-top box hardware (e.g., modems, interface ports, smart card readers, etc.). In one example embodiment, the middleware 246 may include extraction functionality to extract a selected tertiary video stream. For example, the middleware 246 may include crop and scale functionality to crop a portion or subset of an active display area provided by the secondary video stream, and scale the cropped portion or subset for display on the display device 242 so as to encompass an entire display area of the display device 242.

The modulator box 270, in one example embodiment, may receive stored data from the storage unit 272 and a broadcast transmission from the source system 212. The modulator box 270 may multiplex the stored data into the broadcast transmission thereby generating a second transmission that is communicated to the receiver system 216. It will however be appreciated that storage unit functionality is optional. The storage unit 272 may store data and, upon request, communicate the stored data to the modulator box 270 over the network 274 (e.g., Ethernet). The storage unit 272 may communicate the stored data in response to commands that are entered by a user from the set-top box 238 and communicated to the storage unit 272 over the link 276. The link 276 may be any wired or wireless link over which digital data may be communicated (e.g., an 802.11x link, a USB link, an IEEE 1394 link etc.).

Example Method of Receiving and Providing Data

Figure 3:
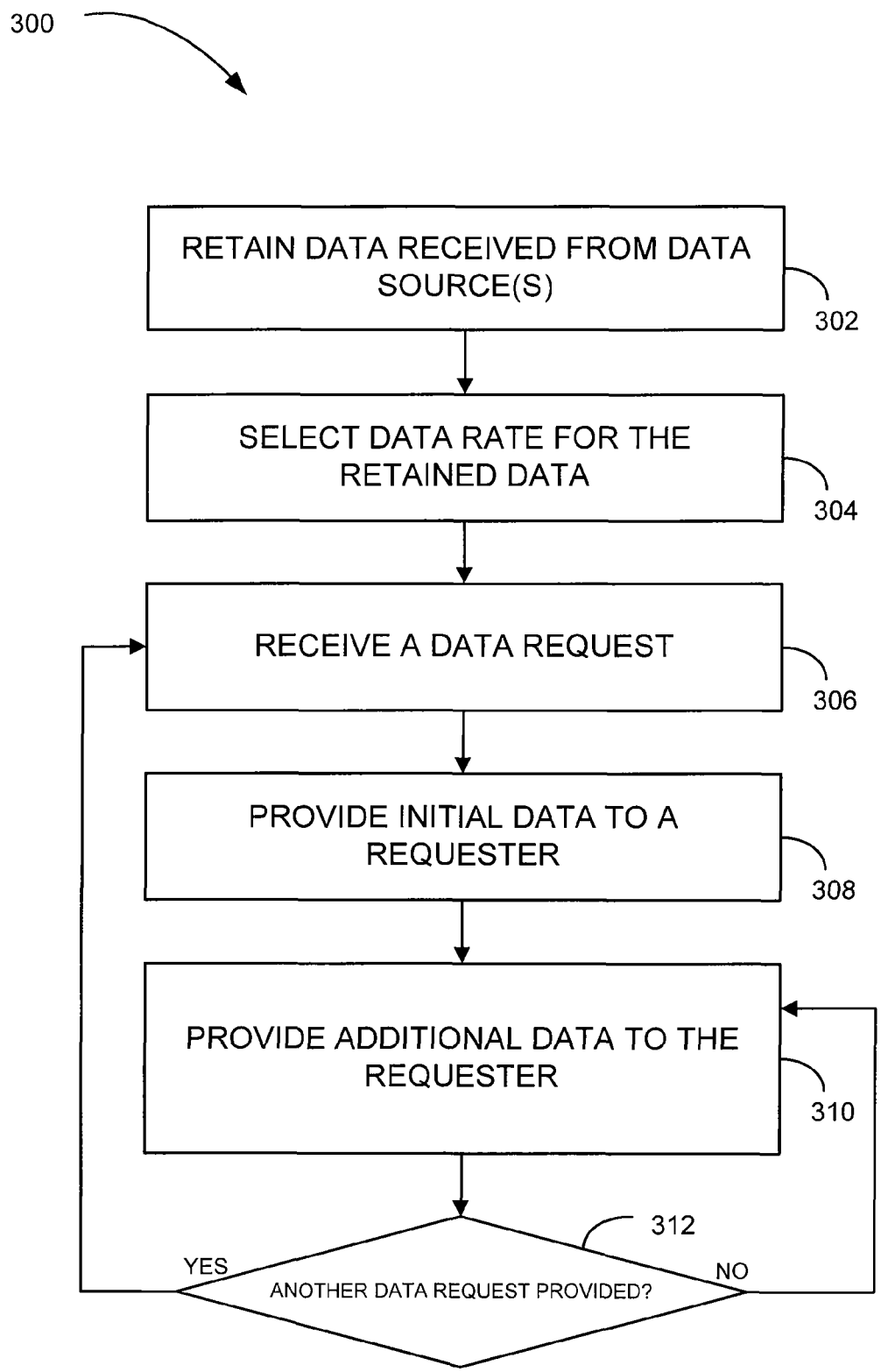
FIG. 3 is a flowchart illustrating a method, in accordance with an example embodiment, for providing data to a requester.

Referring to FIG. 3, a method 300 in accordance with an example embodiment for providing data to a requester is shown. In an example embodiment, the data may be a number of frames of video content from a television channel. The data may be hierarchical data (e.g., of a hierarchical data type) in which interpretation and/or use of future data depends on previous data. The method 300 may be deployed in the system 100 and the interactive television environment 200 (see FIGS. 1 and 2) and, accordingly, is described by way of example with reference thereto.

Data may be received from one or more data sources 102 and retained within a buffer of the switch/router 104, 229 (see FIGS. 1 and 2) at block 302. In an example embodiment, hierarchical data received from a data source may be retained in a buffer.

For example, data in the form of video content may be received via a multicast transmission protocol or a unicast transmission protocol from the data sources 102.

A data rate may be selected for the retained data at block 304. Selection of the data rate may be context sensitive. Thus, for example, the data rate may be calculated for audio content and/or video content (time sensitive content) but may not be calculated for web pages (which is less time sensitive). The data rate may be a fixed or a variable data rate. In an example embodiment, the data rate may be calculated. A fixed data rate may, for example, be selected for retained hierarchical data in the buffer.

A data request may be received by the switch/router 104, 229 at block 306. The data request may include a request for video content of a channel (e.g., a multicast join request).

In response to the data request, initial data may be provided from the switch/router 104, 229 to a requestor at block 308. In an example embodiment, the initial data may include an access point of a data set. The initial data may be the data starting from a first access point until a second access point. For example, the initial data may be a frame of video content designated as a GOP start marker and subsequent frames of the video content until another frame is designated with the GOP start marker. In an example embodiment, the initial data may include frames of the video content that can be used to decode subsequent frames in the data stream of the video content until a next access point is received. The initial data may include intermediate join data, buffered data, and/or delayed data. An example embodiment of providing initial data to the requester is described in greater detail below.

The initial data may include a first packet of an object being transmitted that may be designated as segment 0 (zero) and contain information regarding size and nature of the packetized object which may be first used to download and/or reconstructing the object.

The initial data may be provided at block 308 at the selected data rate selected at block 304 and additional data may be provided to the requester at block 310. The initial data may be provided in parallel to the additional data and, optionally, may be provided at a lower quality. For example, the additional data may be one or more frames of video content after the initial frames of video content are provided for the channel. The additional data may be provided at block 310 at the selected data rate.

In an example embodiment the operations of block 304 and block 306 may occur in parallel, such that the data rate need not be selected before receiving a data request.

At decision block 312, the method 300 may determine whether another new data request is being provided. If another data request is being provided, the method 300 may return to block 302. If the new data request is not being provided, the method 300 may return to block 310.

In an example embodiment for hierarchical (or sequential) data sets, the switch/router 104, 229 may start buffering with a first packet in a sequence or hierarchy as an access point in a data set. Depending on the type of data being processed, the access point may either be explicitly signaled to the switch/router 104, 229, or derived from the data itself through inspection. Whenever a new user joins a multicast of the hierarchical (or sequential) data, the switch/router 104, 229 may start outputting information from a last start packet of data rather than a last packet of data received. In the event that no packet start marker is found in the multicast buffer, the switch/router 104, 229 may pass data through by reverting to an unbuffered mode.

In an example embodiment, each device receiving the initial data at block 308 may receive the same initial data within a certain time period (e.g., before new initial data is contained within a buffer). For example, instead of each requesting device receiving the additional data and waiting until an access point is received before rendering the data, the devices may instead render data as soon as the initial data is received (e.g., by the switch/router 104, 229). The additional data provided at block 310 may then be received and/or processed by the device at a slight delay so that the data is provided continuously.

In an example embodiment, selecting the data rate at block 304 and providing data at the selected data rate at blocks 308, 310 may reduce data rate variations.

The assignment and management of buffers on the switch/router 104, 229 for various multicasts may be simplified by providing explicit signaling to the switch/router 104, 229. For example, configuration information may be sent to the router 104, 229 out of band using a remote management scheme to identify buffered multicasts and associate a particular buffer size. In an example embodiment, explicit marking of multicasts by information embedded in the multicast may be used to indicate properties such as stream priority and data set size.

Example Methods for Transmitting Data

Figure 4:
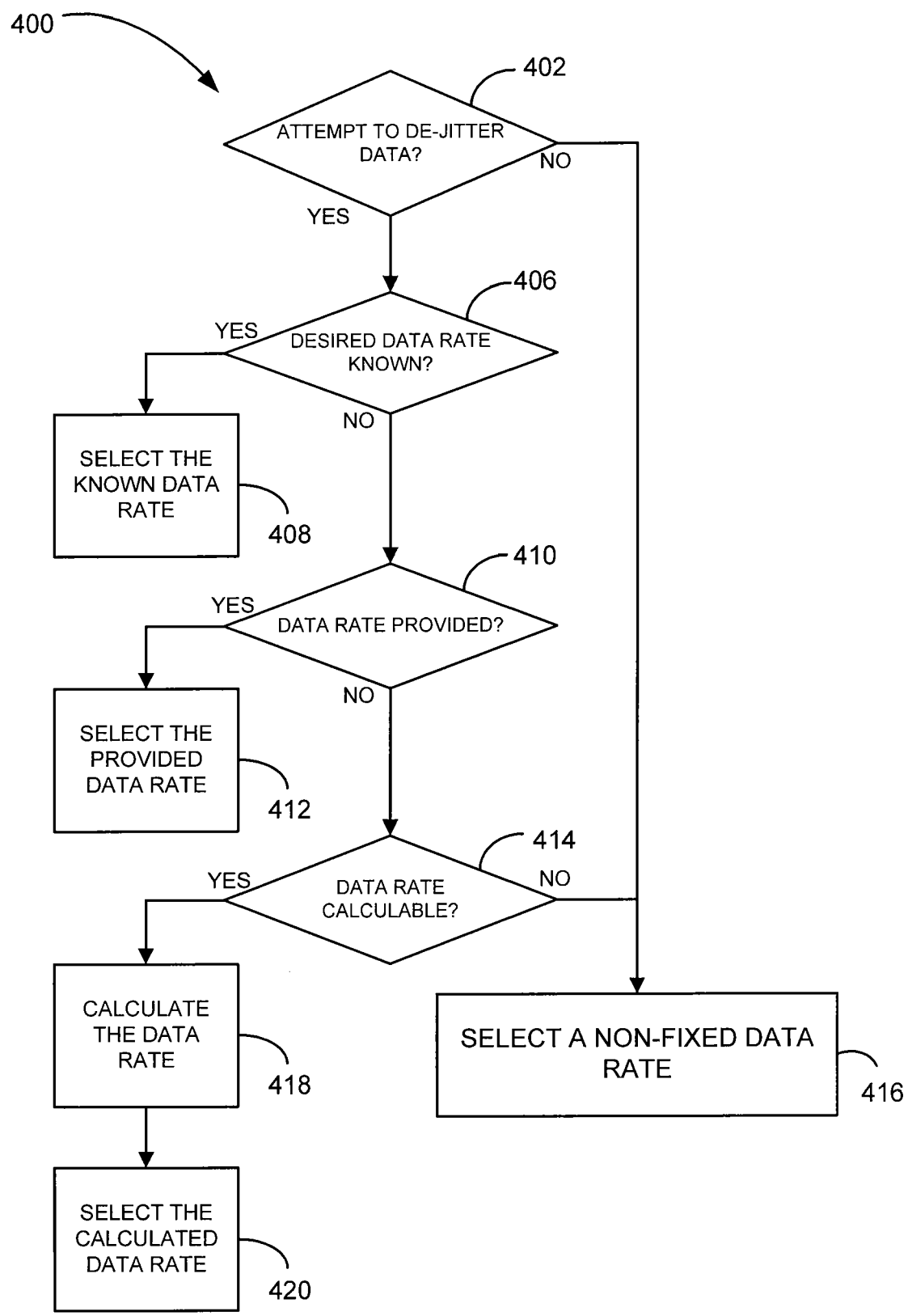
FIG. 4 is a flowchart illustrating a method, in accordance with an example embodiment, for selecting a data rate.

Referring to FIG. 4, a method 400 in accordance with an example embodiment for selecting a data rate is shown. In an example embodiment, the method 400 may be performed at block 306 of the method 300 (see FIG. 3) and may operate on the switch/router 104, 229 (see FIGS. 1 and 2).

A determination may be made at decision block 402 as to whether an attempt to de-jitter the data should be made (e.g., by stabilizing a data rate at which the data may be provided). In an example embodiment, the data may be a frame of video content and the data rate may be a frame rate of video content.

If no attempt is made to de-jitter the data at decision block 402, the method 400 may proceed to select a non-fixed rate for the data as the selected rate (see block 416). For example, the non-fixed rate may be the rate at which the switch/router 104, 229 receives the data. If the method 400 attempts to de-jitter the data at decision block 402, the method 400 may proceed to decision block 406.

The method 400 may determine at decision block 406 whether the date rate for the data is known. If the data rate is known, the method 400 may select a known data rate as the selected data rate at block 408. For example, the data rate may be known when the switch/router 104, 229 is accessing content from a known content source. If the desired date rate is not known at decision block 406, the method 400 may proceed to decision block 410.

At decision block 410, the method 400 may determine whether the data rate has been provided. If the data rate has been provided, the method 400 may select a provided data rate as the selected data rate at block 412.

In an example embodiment, the provided data rate may be received from external signaling. The provided data rate may be embedded within a data stream using, for example, a data tag. If the data rate has not been provided at decision block 410, the method 400 may proceed to decision block 414.

The method 400 may determine at decision block 414 whether the data rate can be calculated. If the data rate can be calculated, the method 400 may calculate the data rate at block 418 and select the calculated data rate as the selected data rate at block 420. For example, the method 400 may calculate the data rate by analyzing an average data rate for a data stream. If the data rate cannot be calculated at decision block 414, the method 400 may proceed to block 416. Dependent upon the outcome at decision blocks 402, 406, 410, and 414 the method 400 may terminate after blocks 416, 408, 412, 416 or block 420 respectively.

Figure 5:
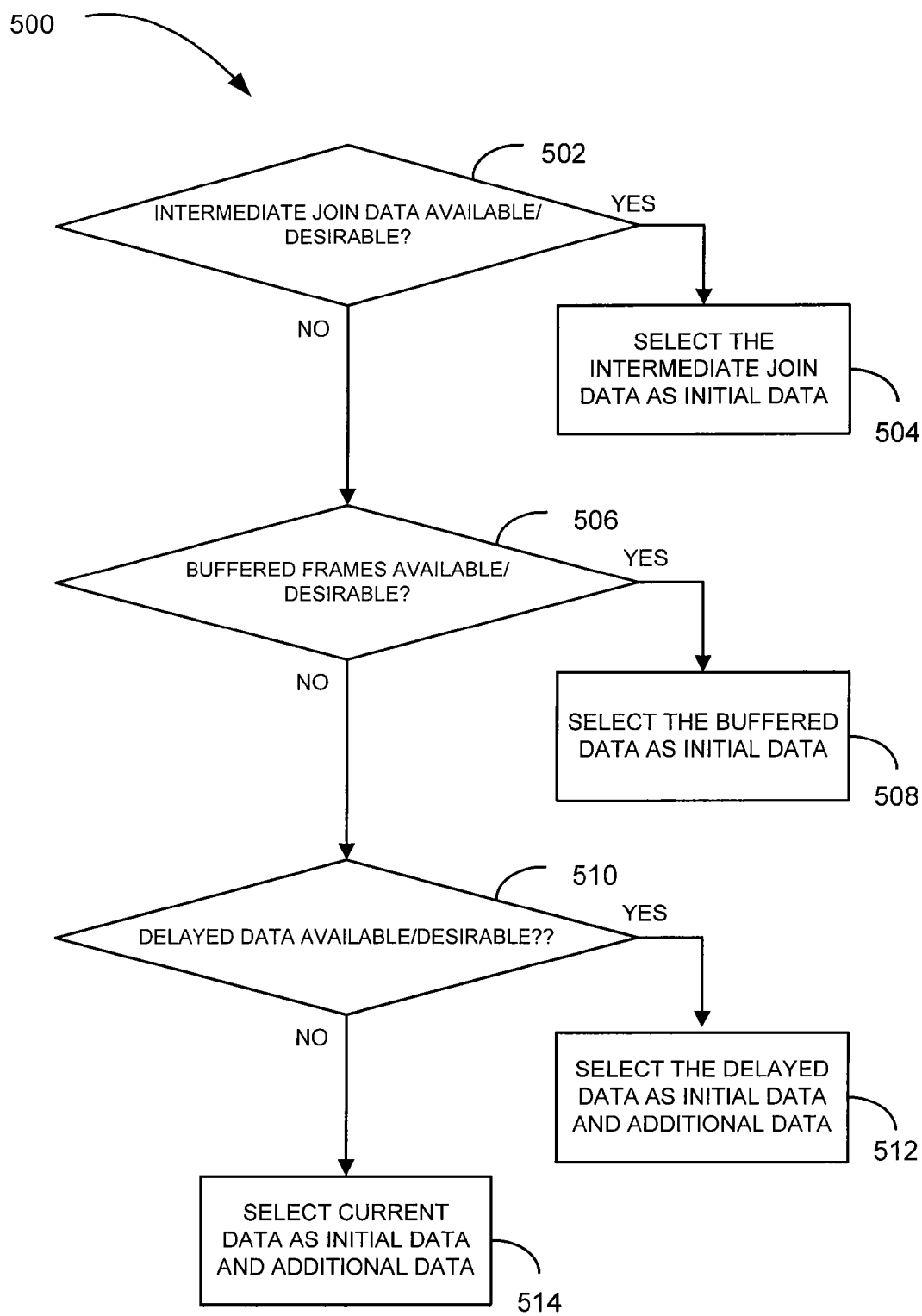
FIG. 5 is a flowchart illustrating a method, in accordance with an example embodiment, for selecting initial data.

Referring to FIG. 5, a method 500 in accordance with an example embodiment for selecting initial data is shown. In an example embodiment, the initial data at block 308 (see FIG. 3) may be selected utilizing the method 500.

The method 500 may determine whether a selection of intermediate join data as the initial data is available and/or desirable at decision block 502. The intermediate join data may act as a synthesized access point to enable access to additional hierarchical data without first receiving an access point of the additional hierarchical data. For example, the access points may provide anchors that reset an interpretation process and initialize an internal state of an interpreter of the hierarchical data. The intermediate join data may be in the form of one or more intermediate join frames that may be retained for use on the switch/router 104, 229 (see FIGS. 1 and 2).

If the intermediate join data is available and/or desirable, the method 500 may select the intermediate join data as the initial data at block 504 so that it may be provided at block 308. Example embodiments for selecting intermediate join data to enable the intermediate join of a data set is described in greater detail below. If the intermediate join data is not available and/or desirable at decision block 502, the method 500 may proceed to decision block 506.

In an example embodiment, the intermediate join data may be desirable when there is bandwidth to send the intermediate join data to the switch/router 104, 229 hooked to a core network, but not enough bandwidth to send the intermediate join data along to a receiver. In an example embodiment in the interactive television environment 200 (see FIG. 2), the intermediate join data may be sent at a lower quality to enable a faster channel change.

At decision block 506, the method 500 may determine whether a selection of buffered data as the initial data is available and/or desirable. If the buffered data is available and/or desirable, the method 500 may select the buffered data as the initial data at block 508. An example embodiment for selecting the buffered data is described in greater detail below. If the buffered data is not available and/or desirable for use as the initial data at decision block 506, the method 500 may proceed to decision block 510.

The method 500 may determine whether a selection of delayed data as the initial data is available and/or desirable at decision block 510. In an example embodiment, the delayed data may be available when a buffer does not retain all data received from a particular program or object and a delayed transmission of the data is available.

If the delayed data is available and/or desirable at decision block 510, the method 500 may select the delayed data as the initial data and the additional data at block 512. For example, the delayed data may include sending data at a delay. If the delayed data is not available and/or desirable at decision block 510, the method 500 may select current data as the initial data and the additional data at block 514.

After the operations at block 504, block 508, block 512, or block 514 are complete, the method 500 may terminate.

Figure 6:
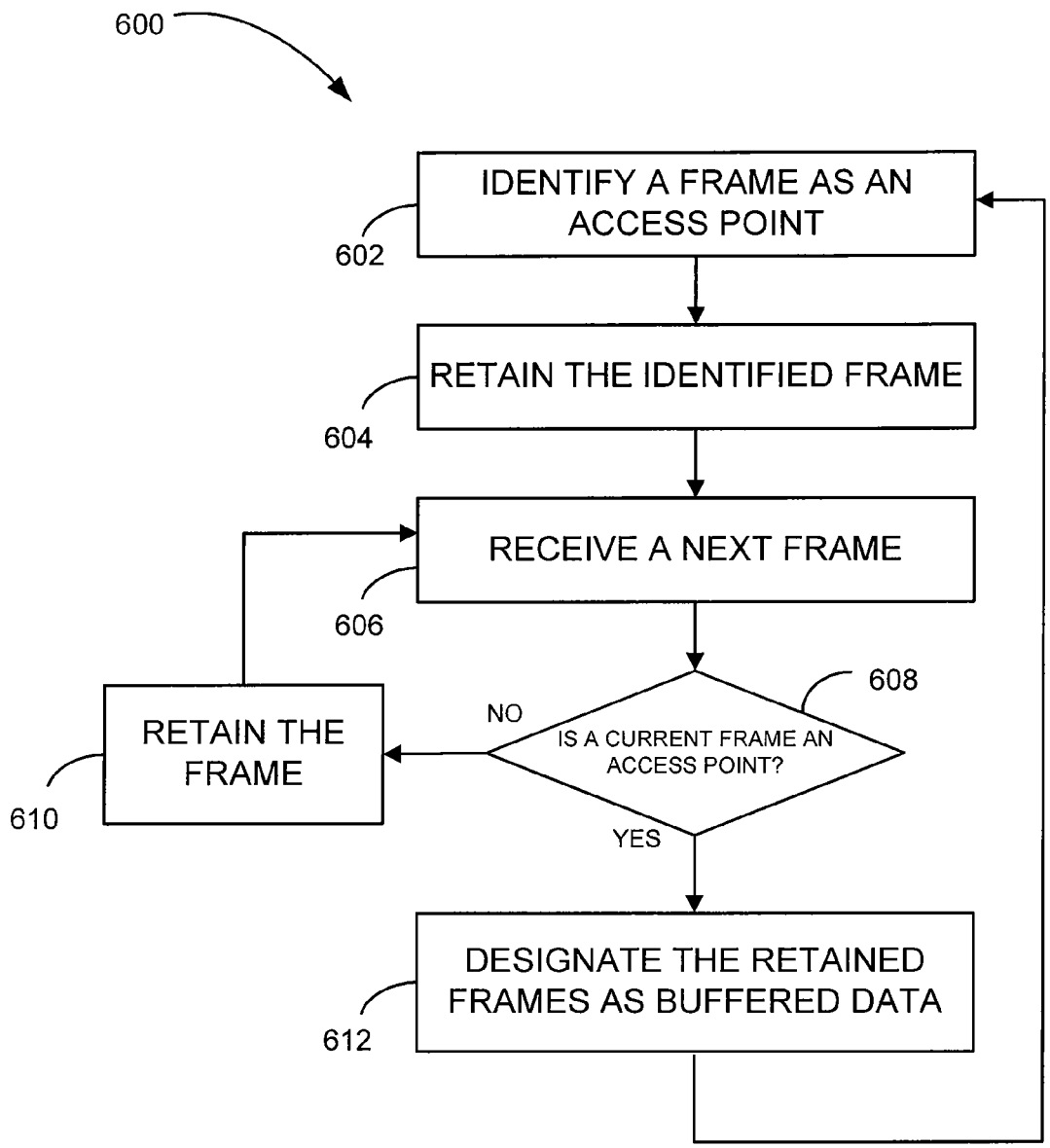
FIG. 6 is a flowchart illustrating a method, in accordance with an example embodiment, for selecting buffered data as initial data.

Referring to FIG. 6, a method 600 in accordance with an example embodiment for selecting buffered data as initial data is shown. In an example embodiment, the method 600 may be performed at block 508 (see FIG. 5). In an example embodiment, the buffered data selected as the initial data may be used during the operations at block 308 (see FIG. 3).

A frame may be identified as an access point in a data set at block 602. In an example embodiment, a first data unit (e.g., a frame) may be identified as a first access point from among a number of data units (e.g., a number of frames). For example, the first data unit may be of a hierarchical data type. In an example embodiment, the data units may be hierarchical data units, such that interpretation and/or use of use of future data units depend on previous data units. Example embodiments of identifying the access point in the data set are described in greater detail below.

The identified frame may be retained as a starting point at block 604. For example, the identified frame may be retained in a buffer of the switch/router 104, 229 (see FIGS. 1 and 2).

A next frame may be received as a current frame at block 606. For example, the next frame in a number of frames (e.g., a data stream of frames of video content) of a channel may be received by the switch/router 104, 229.

The method 600 may determine whether a current frame is another access point (e.g., a second access point) at decision block 608. If the current frame is not an access point, the current frame may be retained (e.g., in a buffer) at block 610 and the method 600 may return to block 606. If the frame is an access point at decision block 608, the starting point and the retained frames may be designated as buffered data at block 612 and the method 600 may return to block 602. For example, the buffer data may be further designated as the initial data at block 508 (see FIG. 5) and/or may be provided to the requester as the initial data at block 308 (see FIG. 3).

In an example embodiment, the frame identified as the access point at block 602 upon the start of method 600 may be identified as a first access point and the frame identified as the access point after the decision block 608 at block 602 may be identified as the second access point. In an example embodiment, frames before the starting point may be discarded from the buffer.

Figure 7:
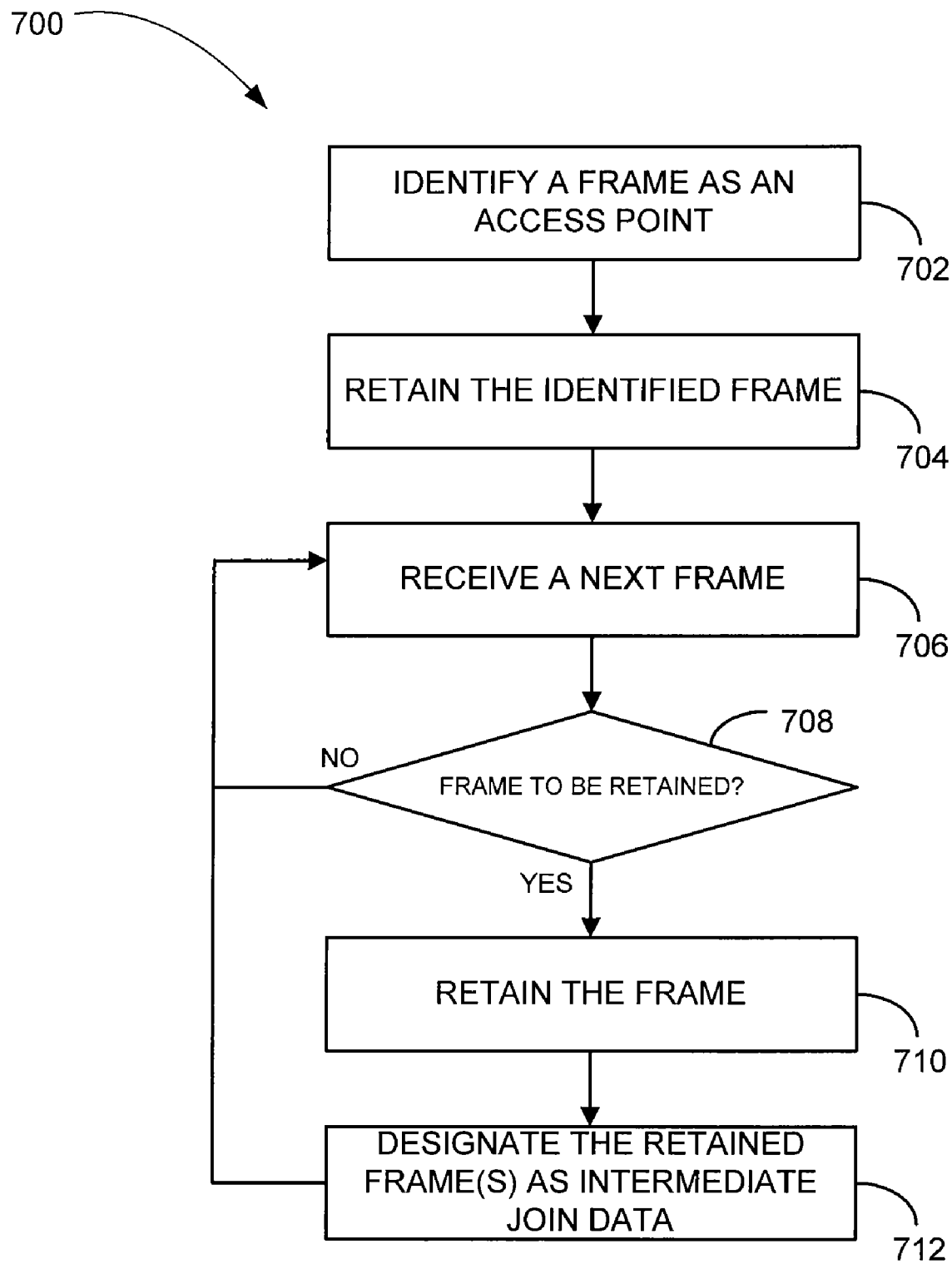
FIG. 7 is a flowchart illustrating a method, in accordance with an example embodiment, for selecting intermediate join data as initial data.

Referring to FIG. 7, a method 700 in accordance with an example embodiment for selecting intermediate join data as initial data is shown. In an example embodiment, the method 700 may be performed at the block 504 (see FIG. 5). In an example embodiment, the intermediate join data selected as the initial data may be used during the operations at block 308 (see FIG. 3).

A frame may be identified as an access point at block 702. In an example embodiment, the operations of block 602 (see FIG. 6) may be performed at block 702. An example embodiment of identifying a frame as an access point is described in greater detail below.

The identified frame may be retained at block 704. For example, the identified frame may be retained in a buffer of the switch/router 104, 229 (see FIGS. 1 and 2). In an example embodiment, a first data unit may be identified at block 702 and retained as an access point among a number of data units at block 704.

A next frame may be received at block 706. For example, the next frame in a number of frames (e.g., a data stream of frames of video content) of a channel may be received by the switch/router 104, 229.

At decision block 708, a determination may be made as to whether the received frame should be retained. For example, the received frame may be retained when the frame may be used to decode a remaining portion of the number of frames of the channel until a next access point is received. If the received frame is not to be retained, the method 700 may return to block 706. If the received frame is to be retained at decision block 708, the method 700 may proceed to block 710.

The received frame may be retained (e.g., in a buffer) at block 710. Each of the received frames that have been retained at block 710 may be designated as the intermediate join data at block 712. For example, the intermediate join data may be further designated as the initial data at block 504 (see FIG. 5) and/or may be provided to the requester as the initial data at block 308 (see FIG. 3). After completing the operations at block 712, the method 700 may return to block 706.

In an example embodiment, after all retained frames have been designated as intermediate join data at block 712, the method 700 may terminate.

After the completion of the operation at block 712, retained data units (e.g., the received frames that have been retained) may be provided in response to a request (e.g., a channel change request) when a current data unit (e.g., a current frame) of the number of data units (e.g., the frames of video content) is not an access point.

In an example embodiment, one or more additional data units of a number of data units after an access point may be identified at block 710 and retained at block 712, the retained data units being to decode the number of data units after the access point until a next access point. The retained data units may then be provided in response to a request (see block 308 of FIG. 3) when a current data unit of the number of data units is not an access point.

Figure 8:
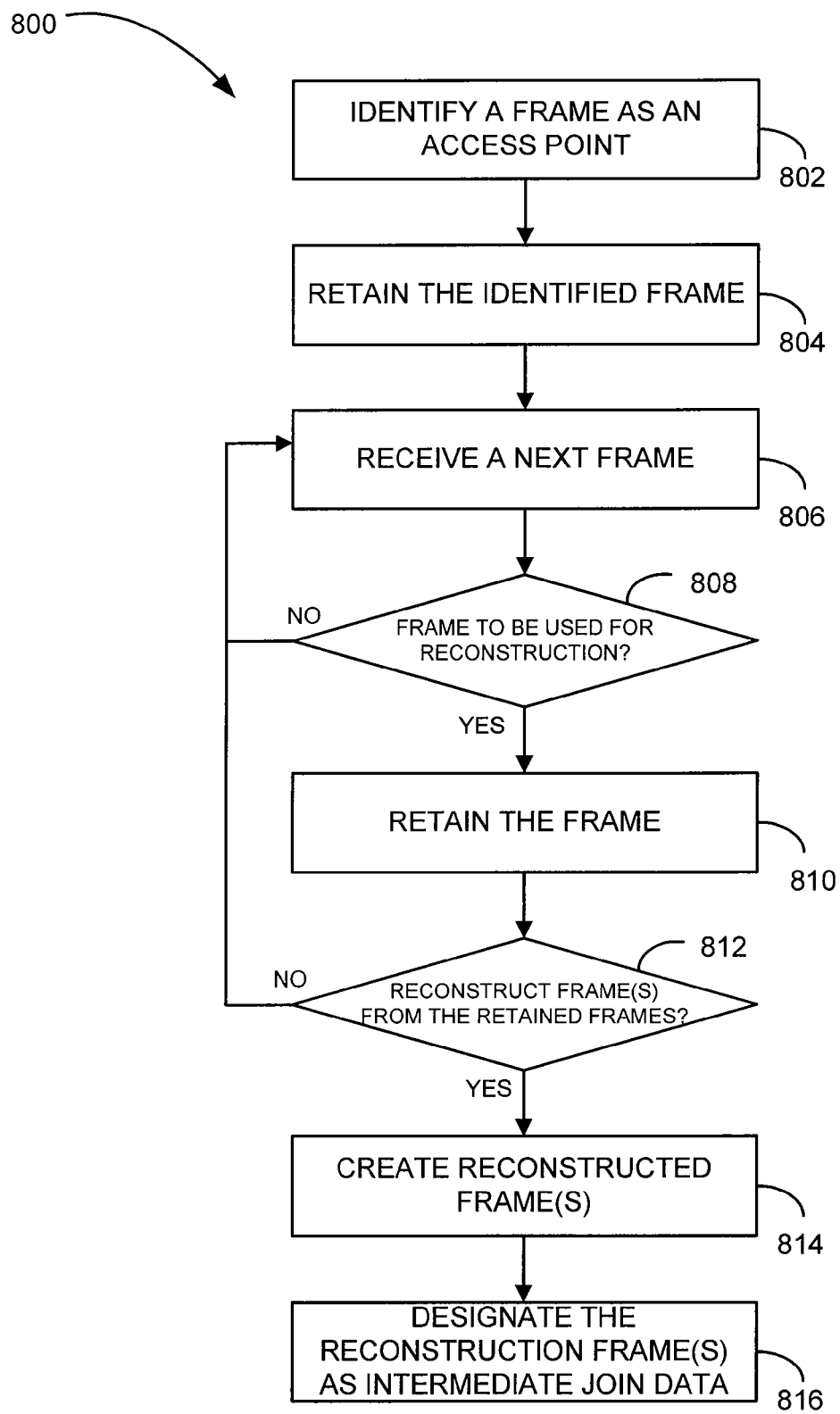
FIG. 8 is a flowchart illustrating a method, in accordance with an example embodiment, selecting intermediate join data as initial data.

Referring to FIG. 8, a method 800 in accordance with an example embodiment for selecting intermediate join data as initial data is shown. In an example embodiment, method 800 may be performed at block 504 (see FIG. 5). In an example embodiment, the intermediate join data selected as the initial data may be used during the operations at block 308 (see FIG. 3).

A frame may be identified as an access point at block 802. In an example embodiment, the operations of block 702 (see FIG. 7) may be performed at block 802. An example embodiment of identifying data (e.g., a frame) as an access point is described in greater detail below.

The identified frame may be retained at block 804. In an example embodiment, the operations of block 704 (see FIG. 7) may be performed at block 804. For example, a first data unit may be identified at block 802 and retained at block 802 as an access point among a plurality of data units.

A next frame may be received at block 806. For example, the next frame in a number of frames (e.g., a data stream of frames of video content) of a channel may be received by the switch/router 104, 229.

At decision block 808, a determination may be made as to whether the received frame may be used for reconstruction (e.g., reconstructing subsequent data). For example, the received frame may be used for reconstruction when the received frame may be used to decode other frames, which may include a data stream of video content.

If the received frame will not be used for reconstruction, the method 800 may return to block 806. If the received frame will be used for reconstruction, the method 800 may retain the received frame at block 810 and proceed to decision block 812.

At decision block 812, the method 800 may determine whether to create reconstruction frames from the retained frames. If the reconstruction frames are not to be created, the method 800 may return to block 806. If the reconstruction frames are to be created, the reconstructed frames may be created at block 814 and the reconstruction frames may be designated as intermediate join data at block 816. For example, the reconstructed frames may be created by reconstructing and re-encoding one or more frames from other frames in the buffer, such that the reconstructed frames may be used to decode other frames. In an example embodiment, the reconstructed frames may be marked as reconstructed frames at block 814.

In an example embodiment, the frames of which the replacement frames are replacing may be discarded from the buffer at block 814.

The reconstruction frames may be created at a same bit rate as the retained frames. However, in other embodiments the reconstruction frames may be created at a different bit rate (e.g., a lower bit rate) as the retained frames. After block 816, the method 800 may terminate.

After completing the operations at block 816, a first data unit (e.g., a first frame) and reconstructed data units (e.g., the reconstructed frames) may be provided in response to a request (e.g., a channel change request) when a current data unit (e.g., a current frame) of the number of data units is not an access point. For example, the intermediate join data may be further designated as the initial data at block 504 (see FIG. 5) and/or may be provided to the requester as the initial data at block 308 (see FIG. 3).

While the methods 600, 700, 800 (see FIGS. 6-8) refer to data in the form of frames, it should be appreciated that the methods 600, 700, 800 may be used with other types of data such as hierarchical data.

Figure 9:
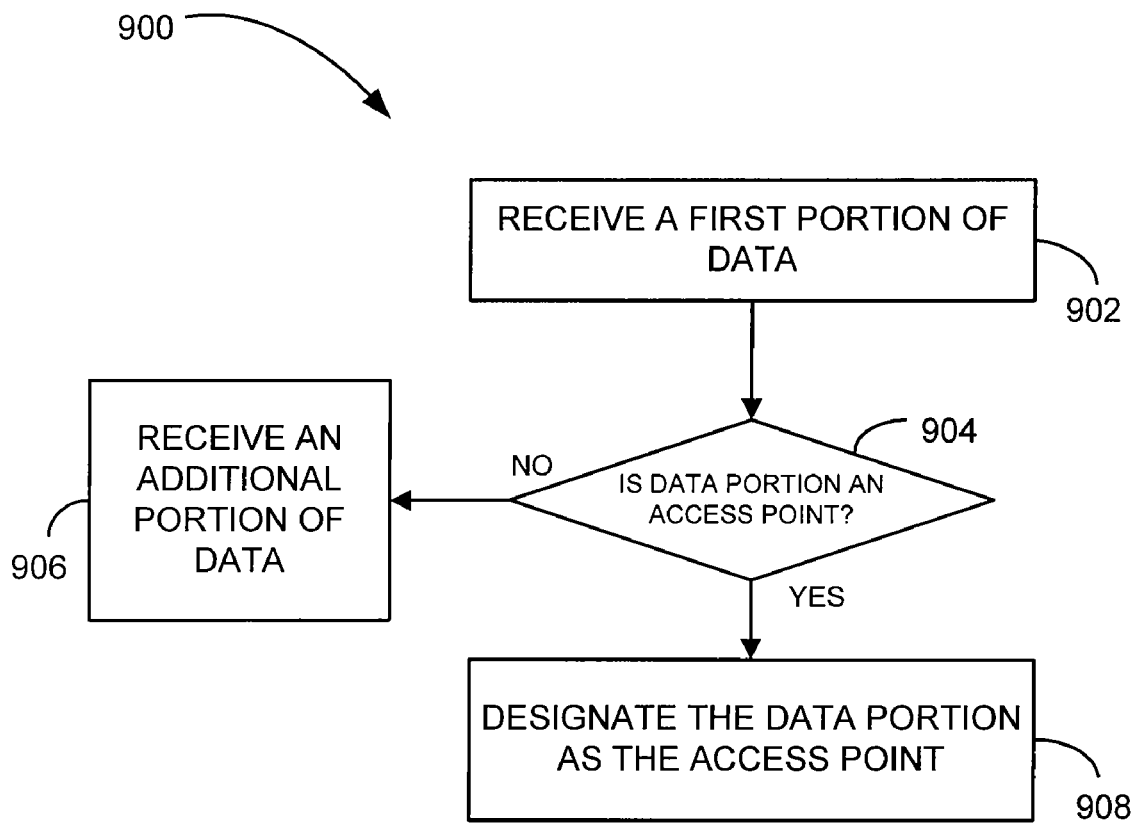
FIG. 9 is a flowchart illustrating a method, in accordance with an example embodiment, for identifying data as an access point.

Referring to FIG. 9, a method 900 in accordance with an example embodiment for identifying data as an access point is shown. In an example embodiment, the method 900 may be performed at block 602 (see FIG. 6), at block 702 (see FIG. 7), and/or at block 802 (see FIG. 8).

A first portion of data (e.g., a data unit such as a frame and/or a data packet) may be received at block 902. For example, the first portion of data may be received by the switch/router 104, 229 from the data source 102 and/or headend system 218 (see FIGS. 1 and 2).

At decision block 904, a determination may be made as to whether the received data is an access point. In an example embodiment, the received data may be an access point when the received data is a key frame that can be decoded without reference to other frames. In an example embodiment, the access point may be a starting element of a data stream to be processed before a remaining portion of the data stream. In an example embodiment, the access point may be a top element of a data set (e.g., a directory file) to be processed before a remaining portion of the data set (e.g., files within the directory identified by the directory file) can be processed to enable access to the remaining portion of the data set. In an example embodiment, the access point may be a GOP (group of pictures) start marker. The access point may however be a key frame of video content, such that the key frame may be decoded without reference to other frames of the video content. Other access points may also be provided.

In an example embodiment, the identification of the portion of data as an access point may include an indication in the data of a frame. For example, such an indication may be provided when the frame is part of MPEG-2 data or MPEG-4 data. The identification of the portion of data as an access point may be based on transmission of the data as a first part of a collection of data sections where a data stream carrying the data may include information that indicates a type and start of each data section. The identification of the portion of data as an access point may be signaled through a time code. In an example embodiment, the identification of the portion of data as an access point may be signaled through metadata.

If the received data is not an access point, an additional portion of data may be received at block 906 and the method 900 may return to decision block 904. If the received portion of data is an access point at decision block 904, the method 900 may designate the received portion of data as an access point at block 908. After block 908, the method 900 may terminate.

Example Methods for Using Transmitted Data

Figure 10:
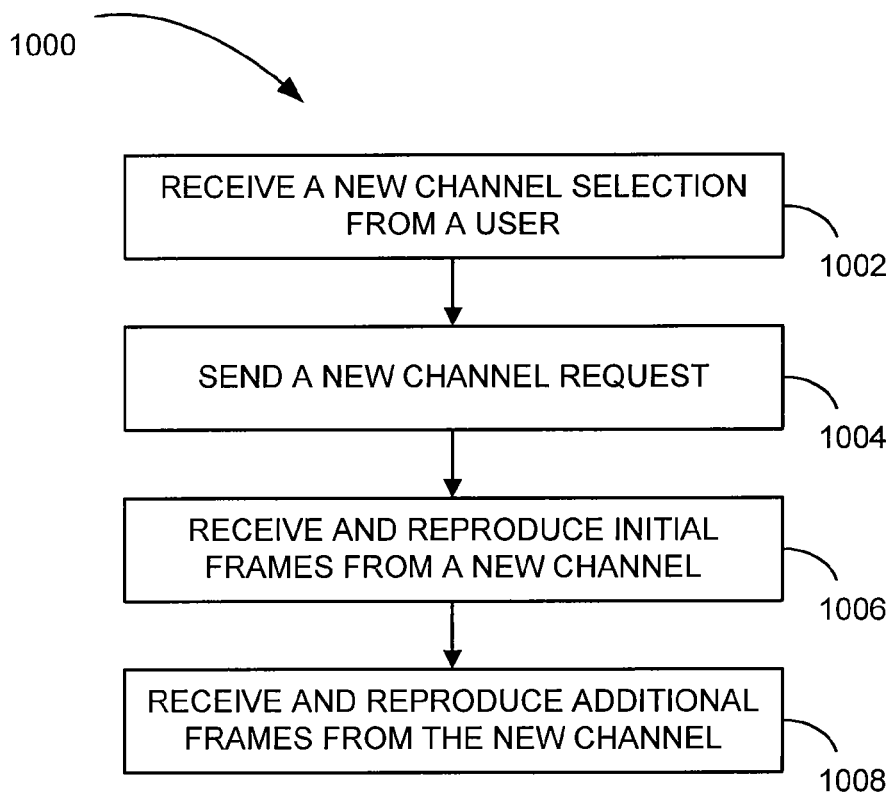
FIG. 10 is a flowchart illustrating a method, in accordance with an example embodiment, for receiving a channel.

Referring to FIG. 10, a method 1000 in accordance with an example embodiment for receiving a channel is shown. In an example embodiment, the method 1000 may operate on the intermediate device 108.1, 108.2 (see FIG. 1), and/or on the set-top box 238 (see FIG. 2).

A new channel selection may be received from a user at block 1002. A new channel request may be sent at block 1004. For example, the intermediate device 108.1, 108.2 and/or the STB 238 may send a multicast join to the switch/router 104, 229.

The initial frames of the new channel may be received and reproduced at block 1006 by the intermediate device 108.1. For example, reproducing the initial frames may include decoding and presenting the initial data.

Additional frames of the new channel may be received and reproduced at block 1008. For example, reproducing the additional frames may include decoding and presenting the additional data. After completion of block 1008, the method 1000 may terminate.

Figure 11:
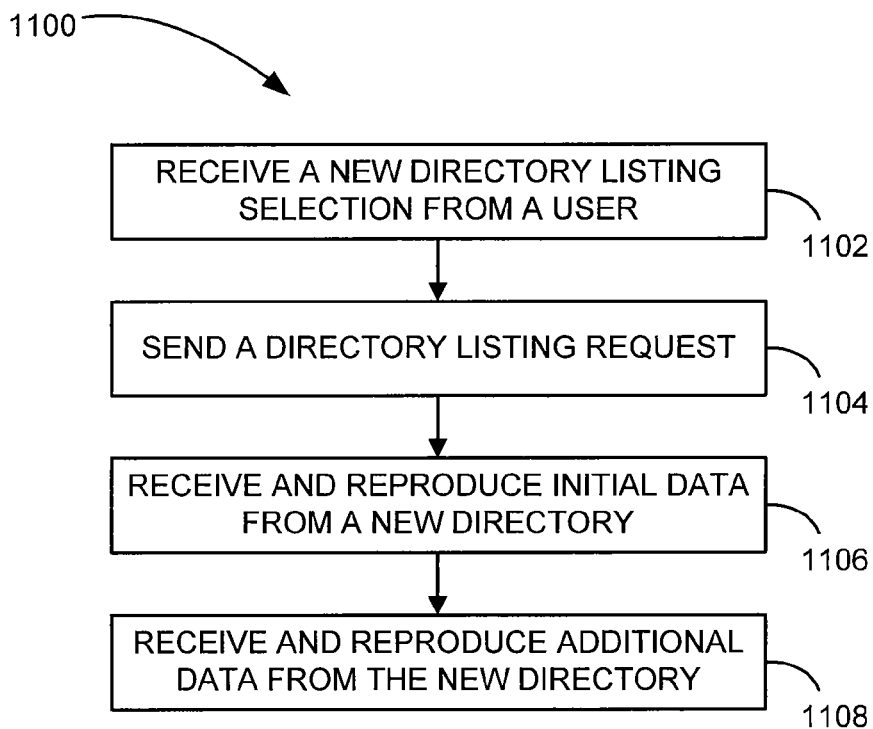
FIG. 11 is a flowchart illustrating a method, in accordance with an example embodiment, for receiving a directory.

Referring to FIG. 11, a method 1100 in accordance with an example embodiment for receiving a directory is shown. The directory may be a directory tree containing code and/or order data. In an example embodiment, the directory may be an electronic program guide (EPG) on an intermediate device 108.1, 108.2 of the system 100 and/or the set-top box 238 of the interactive television environment 200.

A new directory listing selection may be received from a user at block 1102. A directory listing request may be sent at block 1104.

Initial data for a new directory may be received at reproduced at block 1106. Additional data for the new directory may be received at reproduced at block 1108. After block 1108, the method 1100 may terminate.

Example Method for Encoding Video Content

Figure 12:
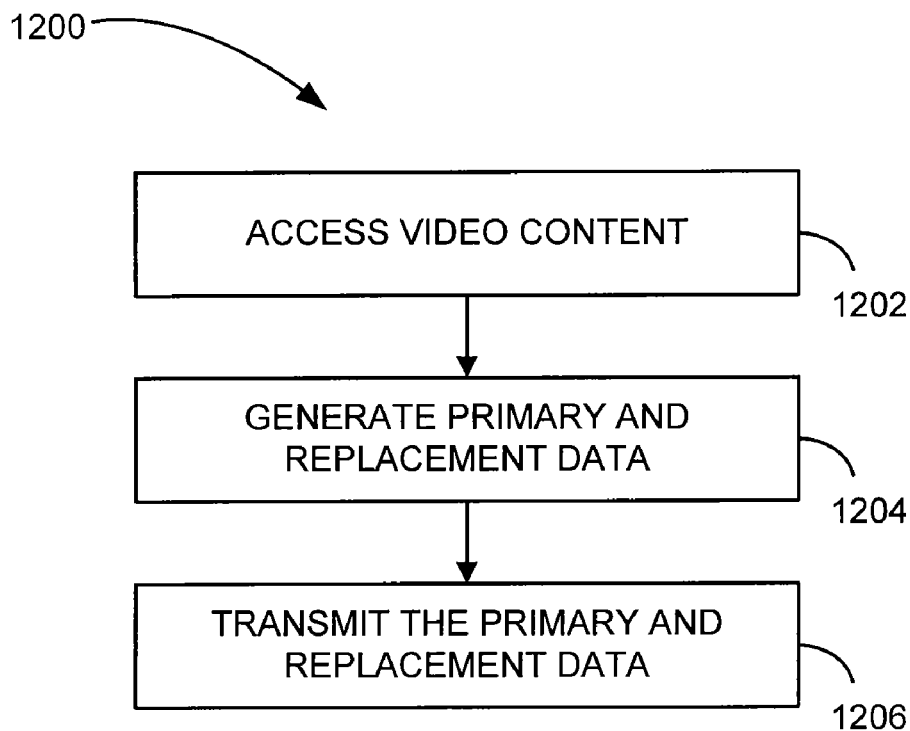
FIG. 12 is a flowchart illustrated a method, in accordance with an example embodiment, for encoding video content.

Referring to FIG. 12, a method 1200 for encoding video content is shown. The video content may be accessed at block 1202. Primary data and replacement data may be generated at block 1204. In an example embodiment, the primary data may be data ordinarily sent without additional access points and the replacement data may include initial data and, optionally, additional data that provides additional access points.

The primary data and replacement data may be transmitted at block 1206. In an example embodiment, the primary data and replacement data may be sent from the data source 102 and/or the headend system 218 to the switch/router 104, 229 (see FIGS. 1 and 2). After completion of block 1206, the method 1200 may terminate.

Example Retained Data as Frames

Figure 13:
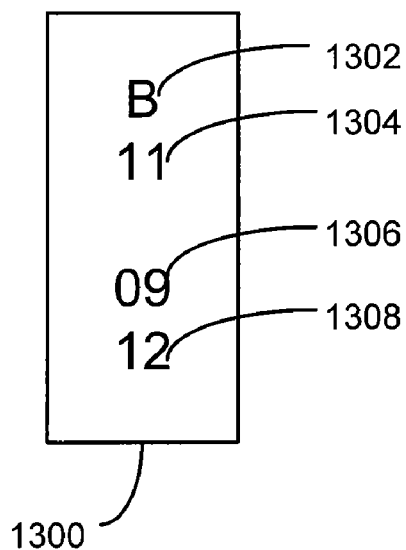
FIG. 13 is a schematic representation of a frame in accordance with an example embodiment.

Referring to FIG. 13, a frame 1300 in accordance with an example embodiment is shown. The frame 1300 may be part of the initial data and/or additional data and is shown to include by way of example a frame type 1302, a presentation frame number 1304, and a frame dependency 1306, 1308.

The frame type 1302 may indicate a type of the frame 1300. For example, an "I" frame may be a standalone frame, a "P" frame may depend on previous "I" frames and/or "P" frames, a "B" frame (as shown by way of example in FIG. 13) may depend on surrounding "I" and/or "P" frames, and a "BR" frame may be used as references for other "B" frames. In an example embodiment, where frames are reconstructed from previously received frames on a device (e.g., the switch/router 104, 229), an "RI" indicator may be used to indicate a reconstructed and re-encoded I frame. Likewise, an "RP" indicator may be used to indicate a reconstructed and re-encoded P frame. Thus, in an example embodiment, reconstructed frames may be identified using the prefix "R" followed by the particular frame type (e.g., I, P, and B). For example, P frames may be predicted frames based on previous frames in a data stream, B frames may be bidirectional frames based on a preceding P frame and a succeeding P frame.

The presentation frame number 1304 may indicate an order in which a series of frames are presented to a user. The frame dependency 1306, 1308 may indicate other frames on which the frame depends.

Figure 14:
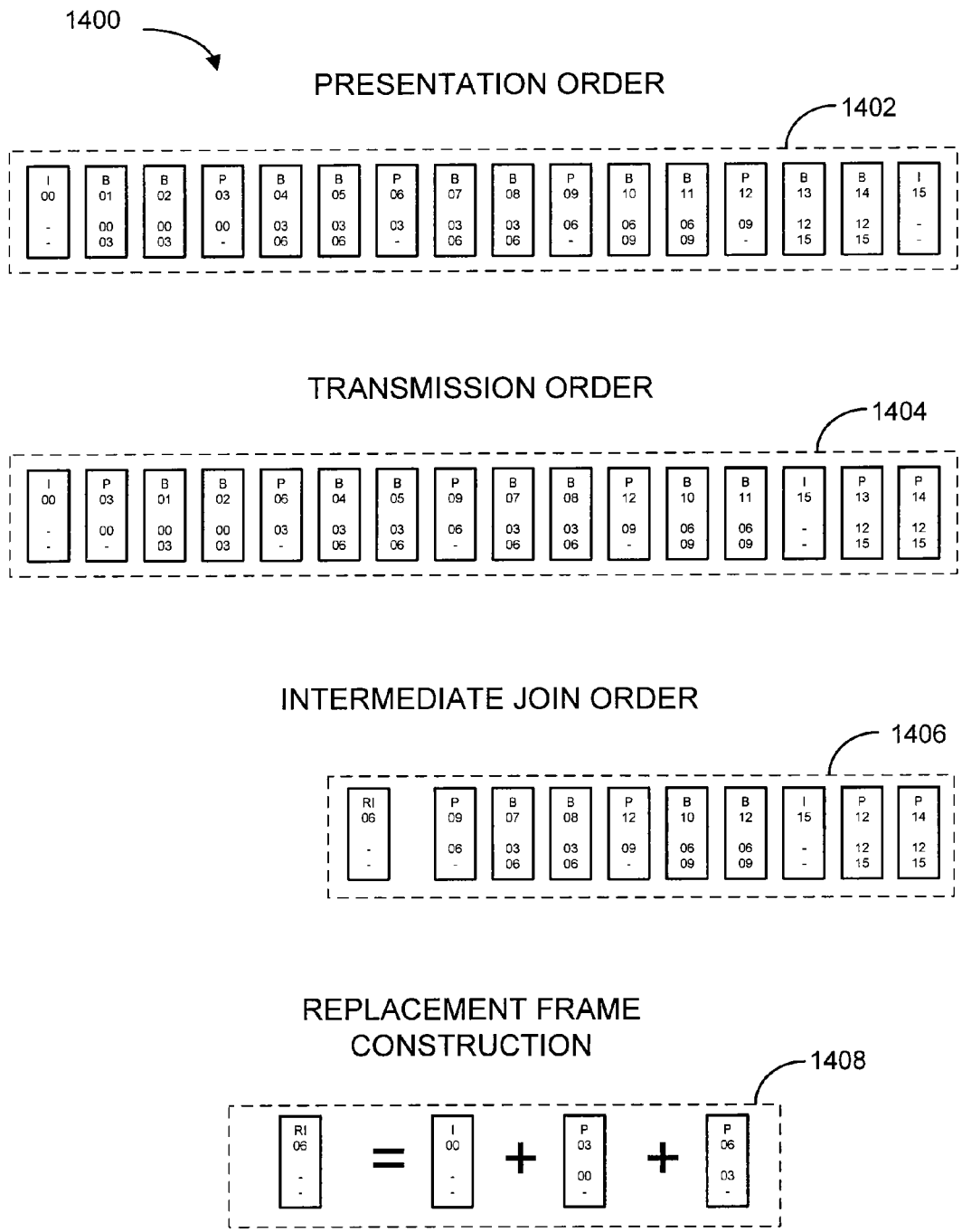
FIGS. 14-17 are schematic representations of a series of frames in accordance with example embodiments.

Referring to FIG. 14, a series of frames 1400 in accordance with an example embodiment is shown. The series of frames 1400 may, for example, be based on an MPEG-2 structure.

A presentation order 1402 may indicate an order in which the series of frames 1400 are presented to a viewer. In an example embodiment as illustrated, the presentation order 1402 may be an I frame 00, a B frame 01, a B frame 02, a P frame 03, a B frame 04, a B frame 05, a P frame 06, a B frame 07, a B frame 08, a P frame 09, a B frame 10, a B frame 11, a P frame 12, a B frame 13, a B frame 14 and an I frame 15.

A transmission order 1404 shows an example of an order in which the series of frames 1400 may be received by a device. The device may, for example, be one of the intermediate devices 108.1, 108.2 (see FIG. 2), the switch/router 229 (see FIG. 2), or any other network device. The transmission order 1404 is shown merely by way of example to be may be an I frame 00, a P frame 03, a B frame 01, a B frame 02, a P frame 06, a B frame 04, a B frame 05, a P frame 09, a B frame 07, a B frame 08, a P frame 12, a B frame 10, a B frame 11, an I frame 15, a B frame 13 and a B frame 14.

An intermediate join order 1406 may include one or more reconstructed frames followed by a number of frames from the transmission order. For example, the intermediate join order 1406 may be a RI frame 06, a P frame 09, a B frame 07, a B frame 08, a P frame 12, a B frame 10, a B frame 11, an I frame 15, a B frame 13 and a B frame 14.

As illustrated, a replacement frame construction 1408 may include a RI frame 06 constructed from an I frame 00 and applying information from a P frame 03 and a P frame 06.

In an example embodiment, one or more replacement frames (e.g., RI frame 06) may be used to initialize the decoder's reference buffers in between GOP starts. The replacement frames may be sent ahead of a convenient position in the actual bit stream to permit decoding to start between original access points. The replacement frames may provide a new access point, effectively dividing a larger data set into a series of smaller data sets. Once the replacement frames have been received, frame data preceding the replacement frame data in the buffer may be discarded.

Figure 15:
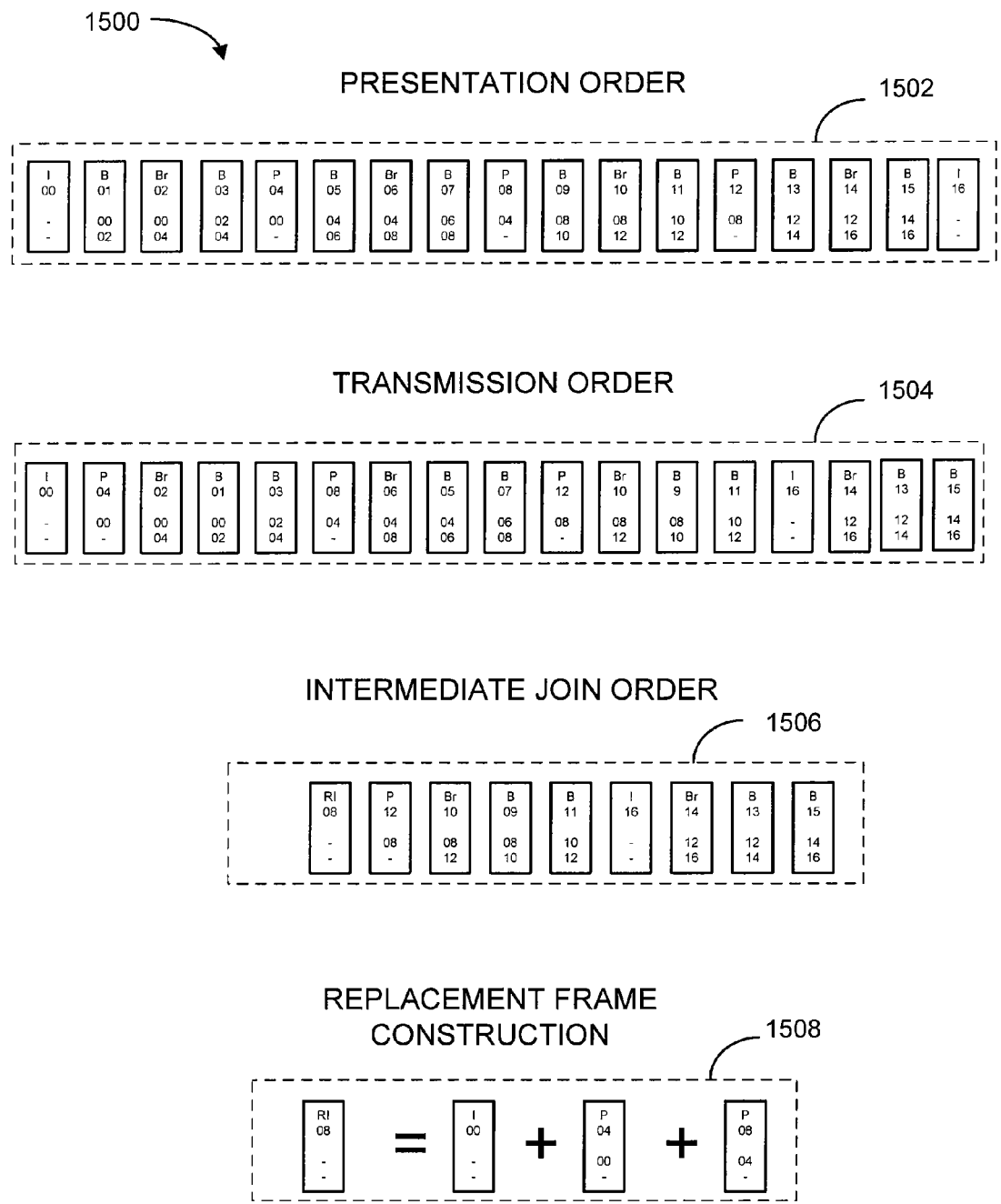

Referring to FIG. 15, a series of frames 1500 in accordance with an example embodiment is shown. In an example embodiment, the series of frames 1500 may represent an application of reference B frames of H.264 format, where the B frames may be used by other B frames during reconstruction. A single replacement frame may be used if the replacement frame is inserted prior to P frames.

A presentation order 1502 may indicate an order in which the series of frames 1500 are presented to a viewer. In an example embodiment as illustrated, the presentation order 1502 may be an I frame 00, a B frame 01, a Br frame 02, a B frame 03, a P frame 04, a B frame 05, a Br frame 06, a B frame 07, a P frame 08, a B frame 09, a Br frame 10, a B frame 11, a P frame 11, a B frame 13, a Br frame 14, a B frame 15, and an I frame 16.

A transmission order 1504 indicates an example order in which the series of frames 1500 may be received by a device. The device may be the intermediate device 108.1, 108.2 (see FIG. 2), the switch/router 229 (see FIG. 2), or any other network device. The transmission order 1504 is shown by way of example to be an I frame 00, a P frame 04, a Br frame 02, a B frame 01, a B frame 03, a P frame 08, a Br frame 06, a B frame 05, a B frame 07, a P frame 12, a Br frame 10, a B frame 9, a B frame 11, an I frame 16, a Br frame 14, a B frame 13 and a B frame 15.

An intermediate join order 1506 may include one or more reconstructed frames followed by a number of frames from the transmission order. The intermediate join order 1506 is shown by way of example to include a RI frame 08, a P frame 12, a Br frame 10, a B frame 09, a B frame 11, an I frame 16, a Br frame 14, a B frame 13, and a B frame 15.

As illustrated, a replacement frame construction 1508 may include a RI frame 08 constructed from an I frame 00 and applying information from a P frame 04 and a P frame 08.

Figure 16:
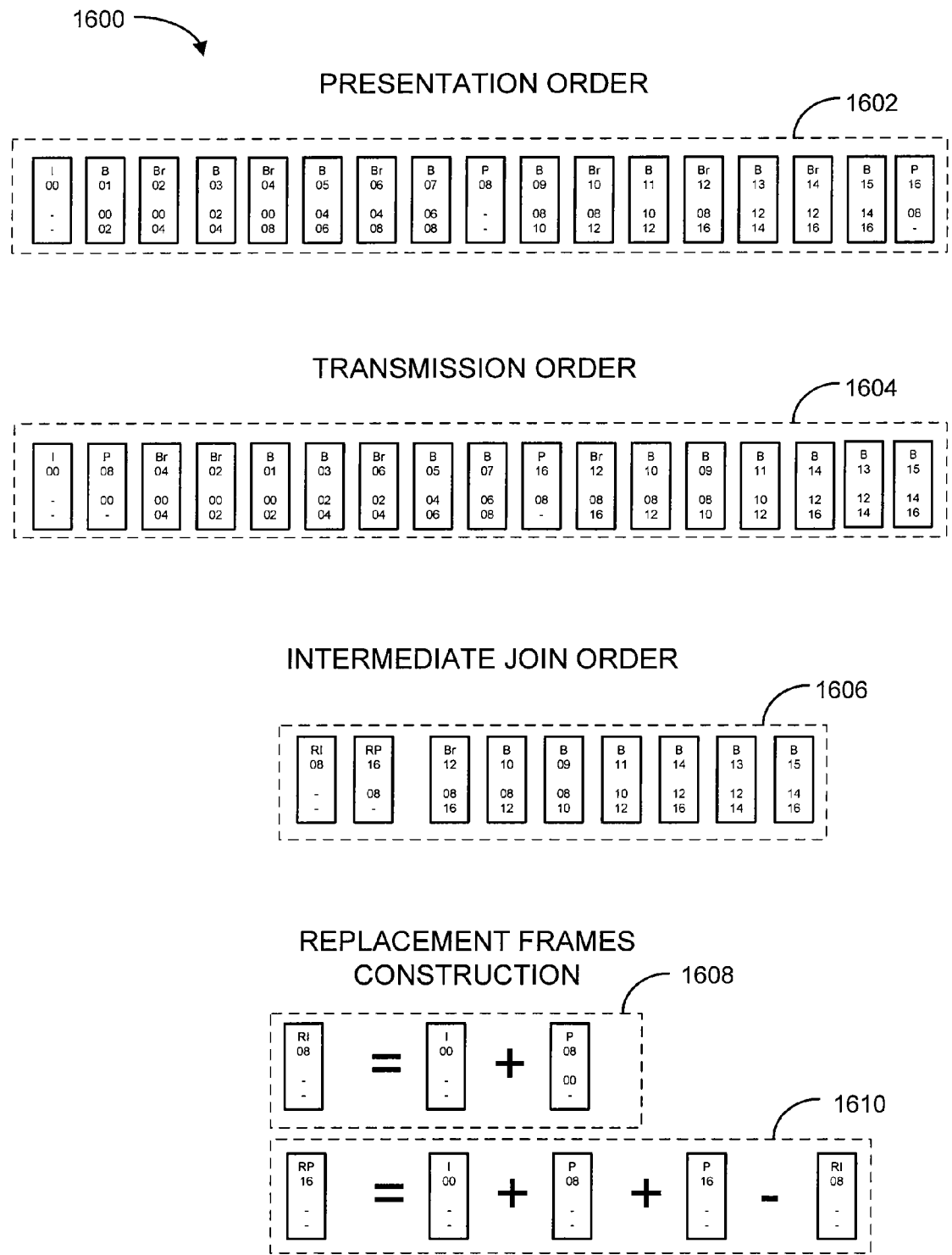

Referring to FIG. 16, a series of frames 1600 in accordance with an example embodiment is shown. The series of frames 1600 may, for example, use two levels of B reference frames.

A presentation order 1602 may indicate an order in which the series of frames 1600 are presented to a viewer. The presentation order 1602 is shown by way of example to be an I frame 00, a B frame 01, a Br frame 02, a B frame 03, a Br frame 04, a B frame 05, a Br frame 06, a B frame 07, a P frame 08, a B frame 09, a Br frame 10, a B frame 11, a Br frame 12, a B frame 13, a Br frame 14, a B frame 15 and a P frame 16.

A transmission order 1604 shows an example order in which the series of frames 1600 may be received by a device. The device may be one of the intermediate device 108.1, 108.2 (see FIG. 2), the switch/router 229 (see FIG. 2), or any other network device. The transmission order 1604 is shown by way of example to be an I frame 00, a P frame 08, a Br frame 04, a Br frame 02, a B frame 01, a B frame 03, a Br frame 06, a B frame 05, a B frame 07, a P frame 16, a Br frame 12, a B frame 10, a B frame 09, a B frame 11, a B frame 14, a B frame 13, and a B frame 15.

An intermediate join order 1606 may include one or more reconstructed frames followed by a number of frames from the transmission order. The intermediate join order 1606 is shown to include a RI frame 08, a RP frame 16, a Br frame 12, a B frame 10, a B frame 09, a B frame 11, a B frame 14, a B frame 13 and a B frame 15.

As illustrated, a first replacement frame construction 1608 may include a RI frame 08 constructed from an I frame 00 and applying information from a P frame 08 and a second replacement frame construction 1610 may include a RP frame 16 constructed from an I frame 00 and applying information from a P frame 08 and a P frame 16 and re-encoding the P frame (e.g., RP frame 16) relative to the RI frame 08 of the first replacement frame construction 1608.

Figure 17:
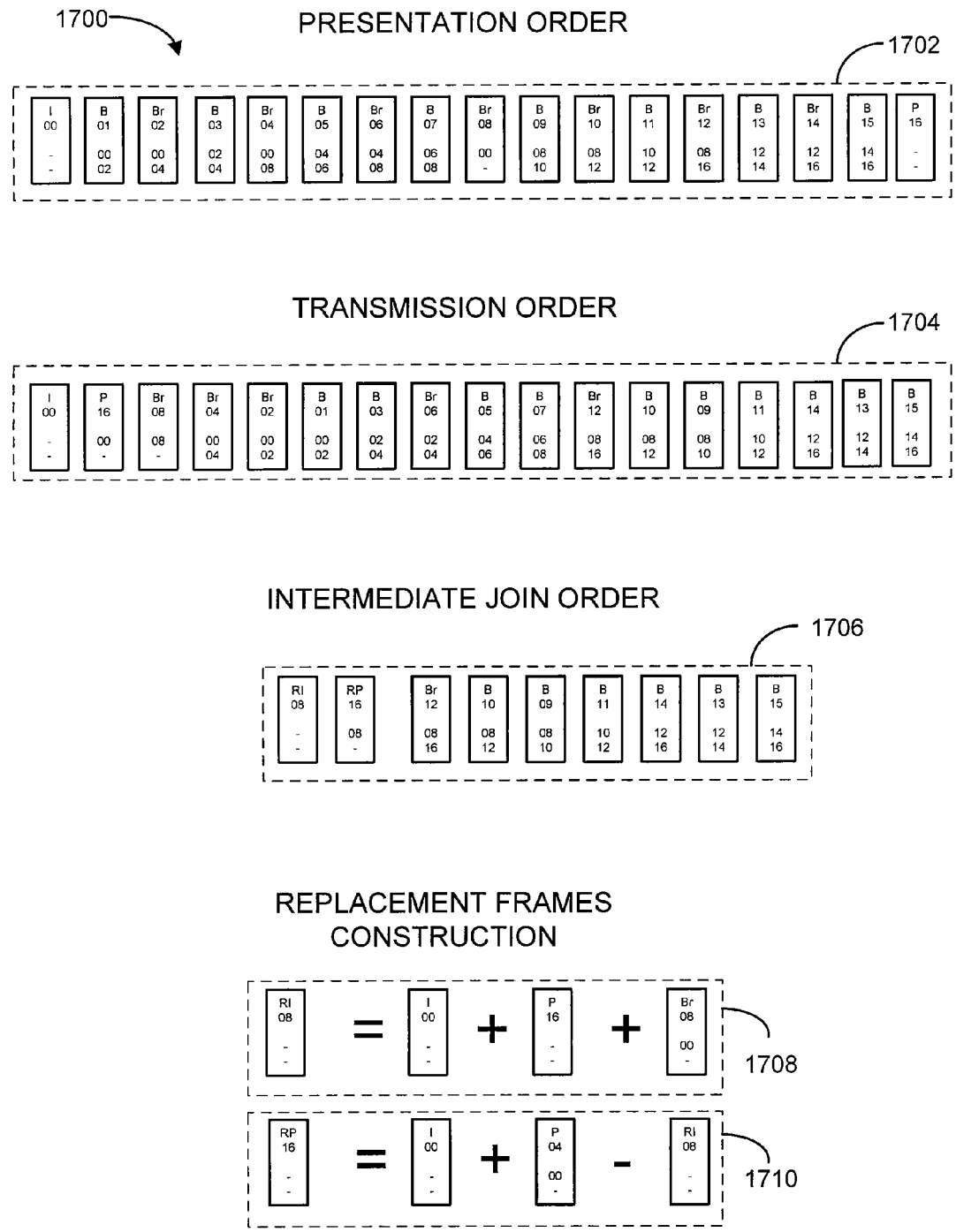

Referring to FIG. 17, a series of frames 1700 in accordance with an example embodiment is shown. In an example embodiment, the series of frames 1700 may use three levels of B reference frames.

A presentation order 1702 may indicate an order in which the series of frames 1700 are presented to a viewer. The presentation order 1702 is shown by way of example to be an I frame 00, a B frame 01, a Br frame 02, a B frame 03, a Br frame 04, a B frame 05, a Br frame 06, a B frame 07, a Br frame 08, a B frame 09, a Br frame 10, a B frame 11, a Br frame 12, a B frame 13, a Br frame 14, a B frame 15, and a P frame 16.

A transmission order 1704 indicates an example order in which the series of frames 1700 are received by a device. In The device may be one of the intermediate device 108.1, 108.2 (see FIG. 2), the switch/router 229 (see FIG. 2), or any other network device. The transmission order 1704 is shown to be an I frame 00, a P frame 16, a Br frame 08, a Br frame 04, a Br frame 02, a B frame 01, a B frame 03, a Br frame 06, a B frame 05, a B frame 07, a Br frame 12, a B frame 10, a B frame 09, a B frame 11, a B frame 14, a B frame 13, and a B frame 15.

An intermediate join order 1706 may include one or more reconstructed frames followed by a number of frames from the transmission order. The intermediate join order 1706 is shown to be a RI frame 08, a RP frame 16, a Br frame 12, a B frame 10, a B frame 09, a B frame 11, a B frame 14, a B frame 13, and a B frame 15.

As illustrated, a first replacement frame construction 1708 may include a RI frame 08 constructed from an I frame 00 and applying information from a P frame 16 and a Br frame 08, and a second replacement frame construction 1710 may include a RP frame 16 constructed from an I frame 00 and applying information from a P frame 04 and re-encoding the P frame (e.g., RP frame 16) relative to the RI frame 08 of the first replacement frame construction 1708.

Example Computing System

Figure 18:
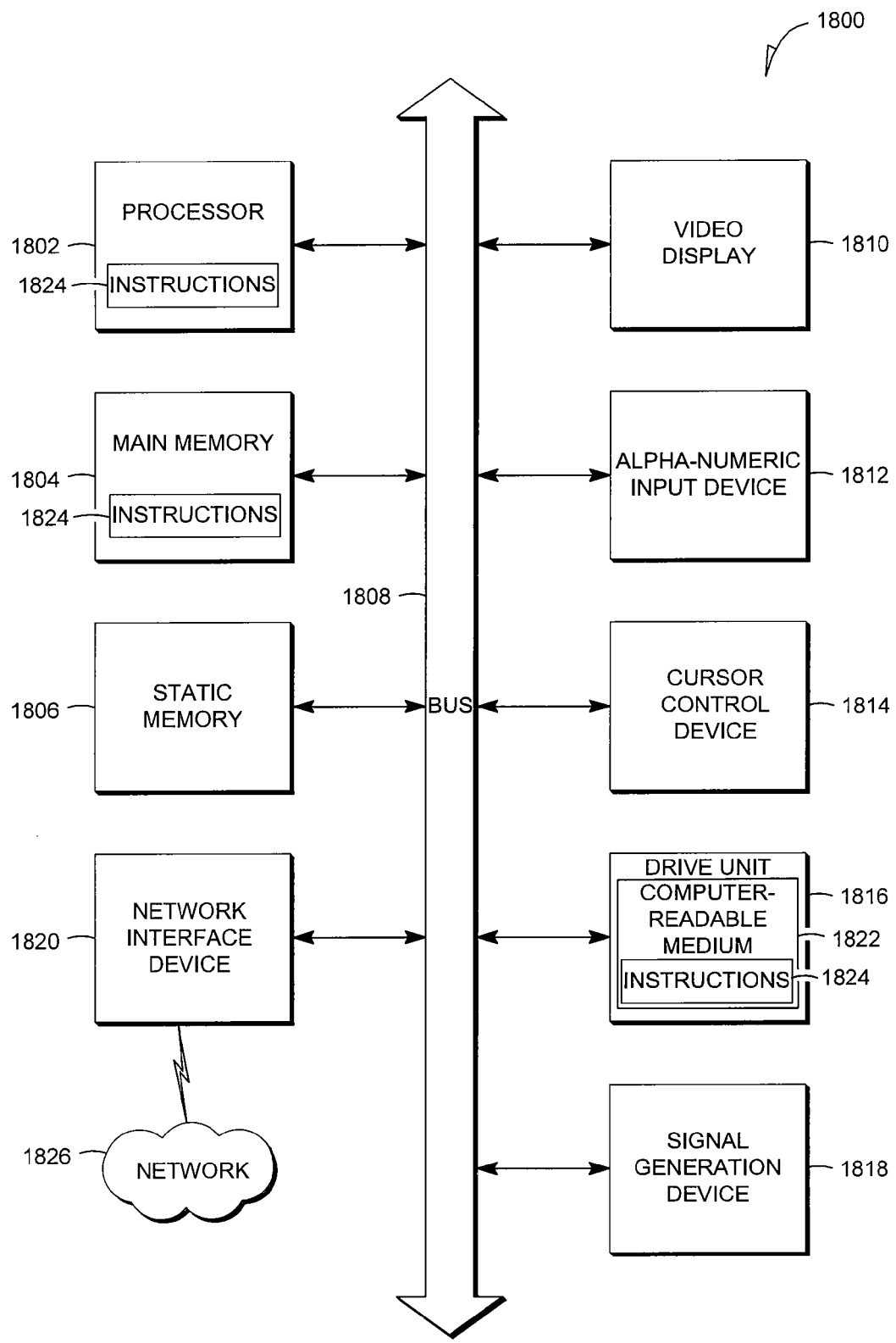
FIG. 18 illustrates a diagrammatic representation of machine in the example form of a computer system within which a set of instructions, for causing the machine to perform any one or more of the methodologies discussed herein, may be executed.

FIG. 18 shows a diagrammatic representation of machine in the example form of a computer system 1800 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1800 includes a processor 1802 (e.g., a central processing unit (CPU), a graphics processing unit (GPU) or both), a main memory 1804 and a static memory 1806 which communicate with each other via a bus 1808. The computer system 1800 may further include a video display unit 1810 (e.g., a liquid crystal display (LCD) or a cathode ray tube (CRT)). The computer system 1800 also includes an alphanumeric input device 1812 (e.g., a keyboard), a user interface (UI) navigation device 1814 (e.g., a mouse), a disk drive unit 1816, a signal generation device 1818 (e.g., a speaker) and a network interface device 1820.

The disk drive unit 1816 includes a machine-readable medium 1822 on which is stored one or more sets of instructions and data structures (e.g., software 1824) embodying or utilized by any one or more of the methodologies or functions described herein. The software 1824 may also reside, completely or at least partially, within the main memory 1804 and/or within the processor 1802 during execution thereof by the computer system 1800, the main memory 1804 and the processor 1802 also constituting machine-readable media.

The software 1824 may further be transmitted or received over a network 1826 via the network interface device 1820 utilizing any one of a number of well-known transfer protocols (e.g., HTTP).

While the machine-readable medium 1822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical media, and magnetic media.

Although an embodiment of the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method for distributing data from a switch/router to an intermediate device connected to one or more user devices, wherein the intermediate device is configured to decode the data and to present the decoded data to the one or more user devices, the method comprising:
    retaining hierarchical data received from a data source in a buffer of the switch/router, wherein the hierarchical data is sequential data in which use of future data depends on previous data;
    selecting a fixed data transmission rate for the retained hierarchical data in the buffer of the switch/router;
    providing initial hierarchical data from the buffer of the switch/router to the intermediate device at the fixed data transmission rate, the initial hierarchical data including an access point to enable decoding of hierarchical data, the access point decodable without reference to other hierarchical data; and
    providing additional hierarchical data from the buffer of the switch/router to the intermediate device at the fixed data transmission rate.

2. The method of claim 1, further comprising selecting at least one of a known data transmission rate, a provided data transmission rate, or a calculated data transmission rate as the fixed data transmission rate.

3. The method of claim 1, further comprising receiving hierarchical data from a data source for at least one of video content or directory data.

4. The method of claim 1, further comprising:
    selecting at least one of intermediate join data, buffered frames, delayed frames, or current frames as the initial hierarchical data.

5. The method of claim 4, further comprising:
    selecting data including a synthesized access point to enable access to the additional hierarchical data without first receiving an access point of the additional hierarchical data as the intermediate join data.

6. The method of claim 1, further comprising:
    selecting data in which at least one of interpretation or use of future data depends on previous data as the hierarchical data.

7. The method of claim 1, including calculating the fixed data transmission rate using an average data rate for the received hierarchical data; and
    wherein the selecting the fixed data transmission rate includes selecting the calculated data transmission rate.

8. The method of claim 1, wherein the retaining the hierarchical data includes retaining hierarchical data of at least one of a first data type or a second data type; and
    wherein the selecting the fixed data transmission rate includes selecting a calculated data transmission rate for the hierarchical data of the first data type and not selecting a calculated data transmission rate for the hierarchical data of the second data type.

9. The method of claim 8, wherein the hierarchical data of the first data type includes at least one of audio content or video content, and wherein the hierarchical data of the second data type includes a web page.

10. The method of claim 1, including:
    providing an additional access point not previously in the received hierarchical data to enable faster access to the received hierarchical data; and
    wherein the providing the initial hierarchical data includes providing the additional access point to enable decoding of the hierarchical data.

11. The method of claim 1, wherein the intermediate device comprises a device selected from a set top box (STB), a digital video recorder (DVR) or a video decoder.

12. The method of claim 1, wherein the switch/router is connected to the data source via a first network and connected to the intermediate device via a second network.

13. The method of claim 1, wherein the switch/router comprises a plurality of buffers, wherein each of the plurality of buffers is associated with a corresponding multicast.

14. The method of claim 13, wherein the switch/router receives is configured to receive configuration information for at least one buffer of the plurality of buffers of the switch/router as out of band communication, wherein the configuration information comprises information prioritizing a multicast stream associated with the at least one buffer.

15. The method of claim 1, wherein the switch/router is configured to receive the hierarchical data and the initial hierarchical data from the data source as a primary data stream and a secondary data stream, respectively.

16. The method of claim 15, wherein the primary data stream comprises original frames including at least one original access point and wherein the secondary data stream comprises a subset of the original frames and at least one new access point.

17. The method of claim 16, wherein the at least one new access point is configured to enable decoding of the subset of the original frames before an additional original access point of the primary data stream subsequent to the at least one original access point is received at the switch/router.

18. The method of claim 15, wherein the switch/router is configured to discard from the buffer a portion of the primary data stream that precedes the secondary data stream when the secondary data stream is received at the switch/router.

19. A method for distributing data from a switch/router to an intermediate device connected to one or more user devices, wherein the intermediate device is configured to decode the data and to present the decoded data to the one or more user devices, the method comprising:
    identifying a first data unit as a first access point among a number of hierarchical data units, wherein the hierarchical data units are sequential data in which use of future data depends on previous data, the first access point to enable decoding of hierarchical data;
    retaining the first data unit and a number of additional data units of the number of hierarchical data in the switch/router units until a second data unit is identified as a second access point among the hierarchical data units;

providing the first data unit and the number of additional data units from the switch/router to the intermediate device in response to a request when a current data unit of the number of hierarchical data units is not the first access point; and wherein the first access point is an initial element among the number of hierarchical data units that enables processing of at least some of the additional data units, the first access point decodable without reference to other data units.

20. The method of claim 19, further comprising selecting a frame of video content as a data unit.

21. The method of claim 19, further comprising selecting a number of hierarchical data units as the number of data units.

22. The method of claim 21, further comprising selecting data units in which at least one of interpretation or use of future data units depend on a received data unit identified as an access point for the future data units as the hierarchical data units.

23. The method of claim 19, further comprising selecting at least one of a channel change request or a directory listing request as the request.

24. The method of claim 19, further comprising selecting a portion of data for at least one of a data packet or a frame of video content after the first access point as the additional data units.

25. The method of claim 19, further comprising selecting a data unit that is used to process the number of additional data units as the first access point.

26. A method for distributing data from a switch/router to an intermediate device connected to one or more user devices, wherein the intermediate device is configured to decode the data and to present the decoded data to the one or more user devices, the method comprising:

identifying and retaining, in the switch/router, a first data unit as an access point among a number of hierarchical data units, wherein the hierarchical data units are sequential data in which use of future data depends on previous data, the access point to enable decoding of hierarchical data, the access point decodable without reference to other hierarchical data;

identifying and retaining, in the switch/router, one or more additional data units of the number of hierarchical data units after the access point, the retained data units being to decode the number of hierarchical data units after the access point until a next access point; and providing the retained data units from the switch/router to the intermediate device in response to a request when a current data unit of the hierarchical number of data units is not an access point.

27. The method of claim 26 further comprising:

selecting at least one of a starting element of a stream of data to be processed before a remaining portion of the stream of data, a top element of a data set to be processed before the remaining portion of the data set, a group of pictures start marker, or a key frame of video content as an access point.

28. The method of claim 27 further comprising:

selecting an element of a data set to be processed before processing a remaining portion of the data set to enable access to the remaining portion of the data set as the top element of the data set.

29. The method of claim 26 further comprising selecting frames of video content as the data units.

30. A method for distributing data from a switch/router to an intermediate device connected to one or more user devices, wherein the intermediate device is configured to decode the data and to present the decoded data to the one or more user devices, the method comprising:

identifying and retaining, in the switch/router, a first data unit as an access point among a plurality of hierarchical data units, wherein the hierarchical data units are sequential data in which use of future data depends on previous data, the access point to enable decoding of hierarchical data, and the access point decodable without reference to other hierarchical data;

identifying and retaining, in the switch/router, data units of the plurality of hierarchical data units after the access point, the retained data units being to decode a remaining portion of the number of hierarchical data units until a next access point;

reconstructing, in the switch/router, data units from the retained data units; and providing from the switch/router to the intermediate device the first data unit and the reconstructed data units in response to a request when a current data unit of the plurality of hierarchical data units is not an access point.

31. The method of claim 30, further comprising:

selecting at least one of a starting element of a data stream to be processed before a remaining portion of a data stream, a top element of a data set to be processed before the remaining portion of the data set, a GOP start marker, and a key frame of video content as an access point.

32. The method of claim 30, further comprising selecting frames of video content as the data units.

33. The method of claim 30, further comprising selecting data units of a hierarchical data type as the data units.

34. A method for distributing data from a switch/router to an intermediate device connected to one or more user devices, wherein the intermediate device is configured to decode the data and to present the decoded data to the one or more user devices, the method comprising:

identifying and retaining, in the switch/router, a first data unit as an access point among a number of hierarchical data units, wherein the hierarchical data units are sequential data in which use of future data depends on previous data, the access point to enable decoding of hierarchical data, and the access point decodable without reference to other hierarchical data;

identifying and retaining, in the switch/router, data units of the number of hierarchical data units after the access point used to decode a remaining portion of the number of hierarchical data units until a next access point;

selecting a data transmission rate; and providing the retained data units from the switch/router to the intermediate device at the calculated data transmission rate in response to a request when a current data unit of the number of hierarchical data units is not an access point.

35. The method of claim 34, further comprising selecting frames of video content as the data units.

36. The method of claim 34, further comprising selecting data units of a hierarchical data type as the data units.

37. A machine-readable medium comprising instructions, which when executed by a machine, cause the machine to perform a method for distributing data from a switch/router to an intermediate device connected to one or more user devices, wherein the intermediate device is configured to decode the data and to present the decoded data to the one or more user devices, the method comprising:

retaining hierarchical data received from a data source in a buffer of the switch/router, wherein the hierarchical data is sequential data in which use of future data depends on previous data;

selecting a fixed data transmission rate for the retained hierarchical data in the buffer of the switch/router;

providing initial hierarchical data from the buffer of the switch/router to the intermediate device at the fixed data transmission rate, the initial data including an access point to enable decoding of hierarchical data, the access point decodable without reference to other hierarchical data; and providing additional hierarchical data from the buffer of the switch/router to the intermediate device at the fixed data transmission rate.

38. A machine-readable medium comprising instructions, which when executed by a machine, cause the machine to perform a method for distributing data from a switch/router to an intermediate device connected to one or more user devices, wherein the intermediate device is configured to decode the data and to present the decoded data to the one or more user devices, the method comprising:

identifying a first data unit as a first access point among a number of hierarchical data units, wherein the hierarchical data units are sequential data in which use of future data depends on previous data, the first access point is to enable decoding of hierarchical data, the first access point decodable without reference to other data units;

retaining the first data unit and a number of additional data units of the number of hierarchical data units in the switch/router until a second data unit is identified as a second access point among the data units;

providing the first data unit and the number of additional data units from the switch/router to the intermediate device in response to a request when a current data unit of the number of hierarchical data units is not the first access point; and wherein the first access point is an initial element among the number of hierarchical data units that enables processing of at least some of the additional data units.

39. A machine-readable medium comprising instructions, which when executed by a machine, cause the machine to perform a method for distributing data from a switch/router to an intermediate device connected to one or more user devices, wherein the intermediate device is configured to decode the data and to present the decoded data to the one or more user devices, the method comprising:

identifying and retaining, in the switch/router, a first data unit as an access point among a number of hierarchical data units, wherein the hierarchical data units are sequential data in which use of future data depends on previous data, the first access point is to enable decoding of hierarchical data, the first access point decodable without reference to other hierarchical data;

identifying and retaining, in the switch/router, one or more additional data units of the number of hierarchical data units after the access point, the retained data units being to decode the number of hierarchical data units after the access point until a next access point; and providing the retained data units from the switch/router to the intermediate device in response to a request when a current data unit of the number of hierarchical data units is not an access point.

40. A machine-readable medium comprising instructions, which when executed by a machine, cause the machine to perform a method for distributing data from a switch/router to an intermediate device connected to one or more user devices, wherein the intermediate device is configured to decode the data and to present the decoded data to the one or more user devices, the method comprising:

identifying and retaining, in the switch/router, a first data unit as an access point among a plurality of hierarchical data units, wherein the hierarchical data units are sequential data in which use of future data depends on previous data, the access point is to enable decoding of hierarchical data, the access point decodable without reference to other hierarchical data;

identifying and retaining, in the switch/router, data units of the plurality of hierarchical data units after the access point, the retained data units being to decode a remaining portion of the number of hierarchical data units until a next access point;

reconstructing, in the switch/router data units from the retained data units; and providing from the switch/router to the intermediate device the first data unit and the reconstructed data units in response to a request when a current data unit of the plurality of hierarchical data units is not an access point.

41. A machine-readable medium comprising instructions, which when executed by a machine, cause the machine to perform a method for distributing data from a switch/router to an intermediate device connected to one or more user devices, wherein the intermediate device is configured to decode the data and to present the decoded data to the one or more user devices, the method comprising:

identifying and retaining, in the switch/router, a first data unit as an access point among a number of hierarchical data units, wherein the hierarchical data units are sequential data in which use of future data depends on previous data;

identifying and retaining, in the switch/router, data units of the number of hierarchical data units after the access point used to decode a remaining portion of the number of hierarchical data units until a next access point, wherein the access point is decodable without reference to other hierarchical data;

select a data transmission rate; and provide the retained data units from the switch/router to the intermediate device at the calculated data transmission rate in response to a request when a current data unit of the number of hierarchical data units is not an access point.

42. An apparatus comprising:

means for retaining hierarchical data received from a data source in a buffer of a switch/router, wherein the switch/router is connected to an intermediate device connected to one or more user devices, wherein the intermediate device is configured to decode data received from the switch/router and to present the decoded data to the one or more user devices, wherein the hierarchical data is sequential data in which use of future data depends on previous data;

means for selecting a fixed data transmission rate for the retained hierarchical data in the buffer;

means for providing initial hierarchical data from the buffer of the switch/router to the intermediate device at the fixed data transmission rate, the initial hierarchical data including an access point to enable decoding of hierarchical data, the access point decodable without reference to other hierarchical data; and means for providing additional hierarchical data from the buffer of the switch/router to the intermediate data at the fixed data transmission rate.

* * * * *

UNITED STATES PATENT AND TRADEMARK OFFICE
CERTIFICATE OF CORRECTION

PATENT NO. : 7,930,449 B2  
APPLICATION NO. : 11/531728  
DATED : April 19, 2011  
INVENTOR(S) : John Tinsman et al.

It is certified that error appears in the above-identified patent and that said Letters Patent is hereby corrected as shown below:

On the face page, in field (75), in "Inventors", in column 1, in line 1, delete "Blonuy" and insert -- Blonay --, therefor.

Signed and Sealed this
Twenty-eighth Day of June, 2011

David J. Kappos
*Director of the United States Patent and Trademark Office*